(12) United States Patent
Glew et al.

(10) Patent No.: US 9,465,657 B2
(45) Date of Patent: *Oct. 11, 2016

(54) ENTITLEMENT VECTOR FOR LIBRARY USAGE IN MANAGING RESOURCE ALLOCATION AND SCHEDULING BASED ON USAGE AND PRIORITY

(75) Inventors: Andrew F. Glew, Hillsboro, OR (US); Daniel A. Gerrity, Seattle, WA (US); Clarence T. Tegreene, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 59 days.

This patent is subject to a terminal disclaimer.

(21) Appl. No.: 13/200,551

(22) Filed: Sep. 24, 2011
(Under 37 CFR 1.47)

(65) Prior Publication Data
US 2013/0024867 A1    Jan. 24, 2013

Related U.S. Application Data

(63) Continuation-in-part of application No. 13/136,024, filed on Jul. 19, 2011, and a continuation-in-part of application No. 13/136,401, filed on Jul. 29, 2011, now Pat. No. 8,943,313, and a continuation-in-part of (Continued)

(51) Int. Cl.
| | |
|---|---|
| G06F 9/455 | (2006.01) |
| G06F 9/46 | (2006.01) |
| G06F 9/48 | (2006.01) |
| G06F 3/12 | (2006.01) |
| G06F 9/50 | (2006.01) |

(52) U.S. Cl.
CPC .......... *G06F 9/4881* (2013.01); *G06F 3/1263* (2013.01); *G06F 9/50* (2013.01); *G06F 9/5011* (2013.01); *G06F 9/5027* (2013.01)

(58) Field of Classification Search
CPC ...... G06F 9/4843; G06F 9/4881; G06F 9/50; G06F 9/505
See application file for complete search history.

(56) References Cited

U.S. PATENT DOCUMENTS

| | | | |
|---|---|---|---|
| 4,087,856 A | 5/1978 | Attanasio | |
| 4,525,599 A | 6/1985 | Curran et al. | |
| 5,437,032 A * | 7/1995 | Wolf et al. | 718/103 |

(Continued)

FOREIGN PATENT DOCUMENTS

WO     WO 01/99075 A2    12/2001

OTHER PUBLICATIONS

Adya et al.; "FARSITE: Federated, Available, and Reliable Storage for an Incompletely Trusted Environment"; 5$^{th}$ Symposium on Operating Systems Design and Implementation; bearing a date of Dec. 2002; pp. 1-14; Boston, MA.

(Continued)

*Primary Examiner* — Meng An
*Assistant Examiner* — Bradley Teets

(57) ABSTRACT

An entitlement vector may be used when selecting a thread for execution in a multi-threading environment in terms of aspects such as priority. An embodiment or embodiments of an information handling apparatus can comprise a library comprising a plurality of functions operable to handle a plurality of objects. The information handling apparatus can further comprise an entitlement vector operable to assign entitlement to at least one of a plurality of resources to selected ones of the plurality of functions.

31 Claims, 14 Drawing Sheets

Related U.S. Application Data application No. 13/136,400, filed on Jul. 29, 2011, now Pat. No. 8,930,714, and a continuation-in-part of application No. 13/136,666, filed on Aug. 4, 2011, and a continuation-in-part of application No. 13/136,670, filed on Aug. 4, 2011, and a continuation-in-part of application No. 13/199,368, filed on Aug. 26, 2011, and a continuation-in-part of application No. 13/200,547, filed on Sep. 24, 2011, now Pat. No. 8,955,111, and a continuation-in-part of application No. 13/200,556, filed on Sep. 24, 2011, and a continuation-in-part of application No. 13/200,557, filed on Sep. 24, 2011, now Pat. No. 9,170,843.

(56) References Cited

U.S. PATENT DOCUMENTS

| | | | | |
|---|---|---|---|---|
| 5,623,637 | A | 4/1997 | Jones et al. | |
| 6,006,328 | A | 12/1999 | Drake | |
| 6,057,598 | A | 5/2000 | Payne et al. | |
| 6,145,064 | A | 11/2000 | Long et al. | |
| 6,154,741 | A * | 11/2000 | Feldman | |
| 6,199,055 | B1 | 3/2001 | Kara et al. | |
| 6,205,544 | B1 | 3/2001 | Mills et al. | |
| 6,584,488 | B1 | 6/2003 | Brenner et al. | |
| 6,654,745 | B2 * | 11/2003 | Feldman | |
| 6,996,547 | B1 | 2/2006 | Tugenberg et al. | |
| 7,035,277 | B1 | 4/2006 | Batcher | |
| 7,054,190 | B2 | 5/2006 | Hanyu et al. | |
| 7,069,447 | B1 | 6/2006 | Corder | |
| 7,093,250 | B1 | 8/2006 | Rector | |
| 7,107,176 | B2 | 9/2006 | Henry et al. | |
| 7,124,170 | B1 | 10/2006 | Sibert | |
| 7,165,150 | B2 | 1/2007 | Alverson et al. | |
| 7,191,185 | B2 | 3/2007 | Dweck et al. | |
| 7,221,600 | B2 | 5/2007 | Hara et al. | |
| 7,284,000 | B2 | 10/2007 | Kuehr-McLaren et al. | |
| 7,379,999 | B1 | 5/2008 | Zhou et al. | |
| 7,395,414 | B2 * | 7/2008 | Le et al. | 712/216 |
| 7,502,946 | B2 | 3/2009 | Perkins et al. | |
| 7,533,242 | B1 | 5/2009 | Moll et al. | |
| 7,533,273 | B2 | 5/2009 | Patariu et al. | |
| 7,549,054 | B2 | 6/2009 | Brodie et al. | |
| 7,594,111 | B2 | 9/2009 | Kiriansky et al. | |
| 7,620,941 | B1 | 11/2009 | Leventhal | |
| 7,644,162 | B1 * | 1/2010 | Zhu et al. | 709/226 |
| 7,676,578 | B1 * | 3/2010 | Zhu et al. | 709/226 |
| 7,708,195 | B2 | 5/2010 | Yoshida et al. | |
| 7,757,282 | B2 | 7/2010 | Pandit et al. | |
| 7,844,733 | B2 | 11/2010 | Betts et al. | |
| 7,861,305 | B2 | 12/2010 | McIntosh et al. | |
| 7,870,610 | B1 | 1/2011 | Mitchell et al. | |
| 7,873,998 | B1 | 1/2011 | Wilkinson et al. | |
| 7,877,585 | B1 | 1/2011 | Coon et al. | |
| 7,953,986 | B2 | 5/2011 | Lee | |
| 7,958,370 | B2 | 6/2011 | Hirai et al. | |
| 7,958,558 | B1 | 6/2011 | Leake et al. | |
| 8,022,724 | B1 | 9/2011 | Jenkins, IV | |
| 8,099,574 | B2 | 1/2012 | Savagaonkar et al. | |
| 8,136,158 | B1 | 3/2012 | Sehr et al. | |
| 8,146,106 | B2 | 3/2012 | Kim et al. | |
| 8,281,388 | B1 | 10/2012 | Sobel et al. | |
| 8,286,250 | B1 | 10/2012 | Le et al. | |
| 8,312,509 | B2 | 11/2012 | Zimmer et al. | |
| 8,381,192 | B1 | 2/2013 | Drewry et al. | |
| 8,397,238 | B2 | 3/2013 | Venkumahanti et al. | |
| 8,473,754 | B2 | 6/2013 | Jones et al. | |
| 8,510,827 | B1 | 8/2013 | Leake et al. | |
| 8,516,583 | B2 | 8/2013 | Thomas et al. | |
| 8,555,390 | B2 | 10/2013 | Thiebeauld de la Crouee et al. | |
| 8,621,144 | B2 | 12/2013 | Eschmann et al. | |
| 8,675,868 | B1 | 3/2014 | Yearsley et al. | |
| 8,683,581 | B2 | 3/2014 | Lefloch | |
| 8,688,583 | B2 | 4/2014 | Boccon-Gibod et al. | |
| 8,694,947 | B1 | 4/2014 | Venkataramani et al. | |
| 8,732,431 | B2 | 5/2014 | Culley et al. | |
| 2002/0040420 | A1 | 4/2002 | Yamauchi et al. | |
| 2002/0075844 | A1 * | 6/2002 | Hagen | 370/351 |
| 2002/0141577 | A1 | 10/2002 | Ripley et al. | |
| 2002/0142833 | A1 | 10/2002 | Tsuchida et al. | |
| 2002/0152212 | A1 * | 10/2002 | Feldman | 707/9 |
| 2002/0156939 | A1 | 10/2002 | Armstrong et al. | |
| 2002/0166058 | A1 | 11/2002 | Fueki | |
| 2003/0046238 | A1 | 3/2003 | Nonaka et al. | |
| 2003/0084308 | A1 | 5/2003 | Van Rijnswou | |
| 2003/0088759 | A1 | 5/2003 | Wilkerson | |
| 2003/0149869 | A1 | 8/2003 | Gleichauf | |
| 2003/0159070 | A1 | 8/2003 | Mayer et al. | |
| 2003/0182436 | A1 * | 9/2003 | Henry | 709/232 |
| 2003/0187974 | A1 | 10/2003 | Burbeck et al. | |
| 2003/0188132 | A1 | 10/2003 | Keltcher et al. | |
| 2004/0054925 | A1 | 3/2004 | Etheridge et al. | |
| 2004/0088691 | A1 | 5/2004 | Hammes et al. | |
| 2004/0116183 | A1 | 6/2004 | Prindle | |
| 2004/0117639 | A1 | 6/2004 | Mowery | |
| 2004/0117790 | A1 * | 6/2004 | Rhine | 718/100 |
| 2004/0153318 | A1 | 8/2004 | Chamberlain | |
| 2004/0199763 | A1 | 10/2004 | Freund | |
| 2004/0236958 | A1 | 11/2004 | Teicher et al. | |
| 2005/0004924 | A1 | 1/2005 | Baldwin | |
| 2005/0060710 | A1 * | 3/2005 | Kush | 718/103 |
| 2005/0081207 | A1 * | 4/2005 | Hoflehner | G06F 8/441 718/100 |
| 2005/0125613 | A1 | 6/2005 | Kim et al. | |
| 2005/0125793 | A1 | 6/2005 | Aguilar et al. | |
| 2005/0138074 | A1 | 6/2005 | O'Connor et al. | |
| 2005/0160428 | A1 | 7/2005 | Ayachitula et al. | |
| 2005/0171903 | A1 | 8/2005 | Yacobi et al. | |
| 2005/0177596 | A1 | 8/2005 | Wu et al. | |
| 2005/0195975 | A1 | 9/2005 | Kawakita | |
| 2005/0213751 | A1 | 9/2005 | Apostolopoulos et al. | |
| 2005/0232415 | A1 | 10/2005 | Little et al. | |
| 2005/0268075 | A1 | 12/2005 | Caprioli et al. | |
| 2006/0005082 | A1 * | 1/2006 | Fossum et al. | 714/42 |
| 2006/0021054 | A1 | 1/2006 | Costa et al. | |
| 2006/0025952 | A1 | 2/2006 | Buhr | |
| 2006/0161715 | A1 | 7/2006 | Hamaguchi | |
| 2006/0161978 | A1 | 7/2006 | Abadi et al. | |
| 2006/0184767 | A1 | 8/2006 | Le et al. | |
| 2006/0289659 | A1 | 12/2006 | Mizushima | |
| 2007/0022287 | A1 | 1/2007 | Beck et al. | |
| 2007/0050477 | A1 | 3/2007 | Isaacs | |
| 2007/0079304 | A1 | 4/2007 | Zheng et al. | |
| 2007/0101433 | A1 | 5/2007 | Louch et al. | |
| 2007/0240215 | A1 | 10/2007 | Flores et al. | |
| 2007/0250837 | A1 * | 10/2007 | Herington et al. | 718/105 |
| 2008/0005586 | A1 | 1/2008 | Munguia | |
| 2008/0028467 | A1 | 1/2008 | Kommareddy et al. | |
| 2008/0046997 | A1 | 2/2008 | Wang | |
| 2008/0052539 | A1 | 2/2008 | MacMillan et al. | |
| 2008/0052541 | A1 | 2/2008 | Ginter et al. | |
| 2008/0072075 | A1 | 3/2008 | Kohiyama et al. | |
| 2008/0104004 | A1 | 5/2008 | Brave et al. | |
| 2008/0114990 | A1 | 5/2008 | Hilbert et al. | |
| 2008/0127335 | A1 | 5/2008 | Khan et al. | |
| 2008/0168279 | A1 | 7/2008 | Kanai | |
| 2008/0184016 | A1 | 7/2008 | Erlingsson et al. | |
| 2008/0222397 | A1 | 9/2008 | Wilkerson et al. | |
| 2008/0222532 | A1 | 9/2008 | Mester et al. | |
| 2008/0250216 | A1 | 10/2008 | Kershaw et al. | |
| 2008/0256346 | A1 | 10/2008 | Lee et al. | |
| 2008/0263663 | A1 | 10/2008 | Ide et al. | |
| 2008/0276317 | A1 | 11/2008 | Chandola et al. | |
| 2008/0279371 | A1 | 11/2008 | Lee et al. | |
| 2008/0288785 | A1 | 11/2008 | Rao et al. | |
| 2008/0301467 | A1 | 12/2008 | Saito | |
| 2008/0313482 | A1 | 12/2008 | Karlapalem et al. | |
| 2008/0320565 | A1 | 12/2008 | Buch et al. | |
| 2009/0006755 | A1 | 1/2009 | Illikkal et al. | |
| 2009/0007125 | A1 | 1/2009 | Barsness et al. | |
| 2009/0028135 | A1 | 1/2009 | Mantripragada et al. | |
| 2009/0038014 | A1 | 2/2009 | Force et al. | |
| 2009/0063824 | A1 | 3/2009 | Leaback et al. | |
| 2009/0070338 | A1 * | 3/2009 | Spitzig et al. | 707/10 |

(56) References Cited

U.S. PATENT DOCUMENTS

| | | |
|---|---|---|
| 2009/0083520 A1 | 3/2009 | Kanemura |
| 2009/0106563 A1 | 4/2009 | Cherpantier |
| 2009/0144557 A1 | 6/2009 | Sutton |
| 2009/0172056 A1 | 7/2009 | Pradhan et al. |
| 2009/0172686 A1 | 7/2009 | Chen et al. |
| 2009/0183263 A1 | 7/2009 | McMichael et al. |
| 2009/0187743 A1 | 7/2009 | Greenhalgh |
| 2009/0187771 A1 | 7/2009 | McLellan, Jr. |
| 2009/0210881 A1 | 8/2009 | Duller |
| 2009/0222910 A1 | 9/2009 | Le Bihan et al. |
| 2009/0265712 A1* | 10/2009 | Herington ............... 718/103 |
| 2009/0282474 A1 | 11/2009 | Chen et al. |
| 2009/0288090 A1 | 11/2009 | Ujibashi et al. |
| 2009/0320129 A1 | 12/2009 | Pan et al. |
| 2009/0320136 A1 | 12/2009 | Lambert et al. |
| 2009/0327718 A1 | 12/2009 | Hirai |
| 2010/0017638 A1 | 1/2010 | Ghose |
| 2010/0042824 A1 | 2/2010 | Lee et al. |
| 2010/0131957 A1 | 5/2010 | Kami |
| 2010/0165991 A1 | 7/2010 | Veal et al. |
| 2010/0191349 A1 | 7/2010 | Munaga |
| 2010/0269168 A1 | 10/2010 | Hegli et al. |
| 2010/0281273 A1 | 11/2010 | Lee et al. |
| 2010/0299305 A1 | 11/2010 | Laxman et al. |
| 2010/0318998 A1 | 12/2010 | Golla |
| 2011/0029140 A1 | 2/2011 | Jordan et al. |
| 2011/0066896 A1 | 3/2011 | Ebina et al. |
| 2011/0072292 A1 | 3/2011 | Khawand et al. |
| 2011/0129024 A1 | 6/2011 | Karthik et al. |
| 2011/0131402 A1 | 6/2011 | Mittal |
| 2011/0131550 A1 | 6/2011 | Burckhardt et al. |
| 2011/0131658 A1 | 6/2011 | Bahl |
| 2011/0138124 A1 | 6/2011 | Hill et al. |
| 2011/0138473 A1 | 6/2011 | Yee et al. |
| 2011/0179176 A1 | 7/2011 | Ravichandran et al. |
| 2011/0202927 A1 | 8/2011 | Miloushev et al. |
| 2011/0289586 A1 | 11/2011 | Kc et al. |
| 2011/0296440 A1 | 12/2011 | Laurich et al. |
| 2011/0307382 A1 | 12/2011 | Siegel et al. |
| 2011/0314254 A1 | 12/2011 | Smriti et al. |
| 2011/0320788 A1 | 12/2011 | Assarpour |
| 2011/0320793 A1 | 12/2011 | Bell, Jr. et al. |
| 2012/0079492 A1* | 3/2012 | Chambliss et al. ........... 718/104 |
| 2012/0102489 A1 | 4/2012 | Staiman et al. |
| 2012/0110292 A1 | 5/2012 | Martini |
| 2012/0159183 A1 | 6/2012 | Adams et al. |
| 2012/0179952 A1 | 7/2012 | Tuyls et al. |
| 2012/0185863 A1* | 7/2012 | Krstic et al. ................. 718/104 |
| 2012/0210325 A1 | 8/2012 | de Lind van Wijngaarden et al. |
| 2012/0221591 A1 | 8/2012 | Yerneni et al. |
| 2012/0233698 A1 | 9/2012 | Watters et al. |
| 2012/0255018 A1 | 10/2012 | Sallam |
| 2012/0255021 A1 | 10/2012 | Sallam |
| 2012/0265975 A1 | 10/2012 | Kimelman |
| 2012/0266243 A1 | 10/2012 | Turkulainen |
| 2012/0278903 A1* | 11/2012 | Pugh ............................. 726/28 |
| 2013/0024867 A1 | 1/2013 | Glew et al. |
| 2013/0081039 A1 | 3/2013 | Glew et al. |
| 2013/0086687 A1 | 4/2013 | Chess et al. |
| 2013/0111489 A1 | 5/2013 | Glew et al. |
| 2013/0111491 A1 | 5/2013 | Glew et al. |
| 2013/0246605 A1 | 9/2013 | Mahadik et al. |
| 2013/0305243 A1 | 11/2013 | Hiki |
| 2014/0245449 A1 | 8/2014 | Powell et al. |

OTHER PUBLICATIONS

Kolbitsch et al.; "Extending Mondrian Memory Protection"; Information Systems and Technology Panel (IST) Symposium, Tallinn, Estonia; bearing a date of Nov. 22-23, 2010; pp. 10-11 through 10-18 and 1 Report Documentation Page; NATO-OTAN.

Bird et al.; "Lighthouse: Hardware Support for Enforcing Information Flow Control on ManyCore Systems"; bearing a date of 2008 (as provided by examiner); 10 pages.

Clause et al.; "Dytan: A Generic Dynamic Taint Analysis Framework"; ISSTA '07; bearing a date of Jul. 9-12, 2007; pp. 196-206; ACM.

Ho et al.; "Practical Taint-Based Protection using Demand Emulation"; EuroSys '06; bearing a date of Apr. 18-21, 2006; 13 pages; ACM.

Newsome et al.; "Dynamic Taint Analysis for Automation Detection, Analysis, and Signature Generation of Exploits on Commodity Software"; Carnegie Mellon University Research Showcase; bearing a date of Jan. 1, 2005; 18 pages.

Schwartz et al.; "All You Ever Wanted to Know About Dynamic Taint Analysis and Forward Symbolic Execution (but might have been afraid to ask)" ; 2010 IEEE Symposium on Security and Privacy; bearing a date of 2010; pp. 317-331; IEEE.

Song et al.; "BitBlaze: A New Approach to Computer Security via Binary Analysis"; ICISS 2008; bearing a date of 2008; pp. 1-25; Springer-Verlag Berlin Heidelberg.

Yin et al.; "Panorama: Capturing System-wide Information Flow for Malware Detection and Analysis"; CCS '07; bearing a date of Oct. 29-Nov. 2, 2007; pp. 116-127; ACM.

Zeldovich et al.; "Hardware Enforcement of Application Security Policies Using Tagged Memory"; bearing a date of 2008 (as provided by examiner), printed Feb. 7, 2013; pp. 1-16; located at: static.usenix.org/events/osdi08/tech/full_papers/zeldovich/zeldovich_html/.

Zhang et al.; "Neon: System Support for Derived Data Management"; VEE '10; bearing a date of Mar. 17-19, 2010; 12 pages; ACM.

Stone, Harold S.; "A Logic-in-Memory Computer"; IEEE Transactions on Computers; bearing a date of Jan. 1970; pp. 73-78.

Abadi et al.; "Control-Flow Integrity: Principles, Implementations, and Applications"; bearing a date of Nov. 1, 2004; pp. 1-33.

Kiriansky et al.; "Secure Execution Via Program Shepherding"; Proceedings of the 11th USENIX Security Symposium; bearing a date of Aug. 2002, created on Dec. 9, 2013; pp. 1-16; San Francisco, CA.

"Opcode"; Wikipedia; bearing a date of Oct. 26, 2014; pp. 1-2; located at: wikipedia.org/w/index.php?title=Opcode&oldid=175723708.

"Instruction Set"; Wikipedia; bearing a date of May 15, 2010; pp. 1-10; located at: wikipedia.org/wiki/Instruction_set.

Liu et al.; "Adaptive Entitlement Control of Resource Containers on Shared Servers"; bearing a date of 2005; pp. 163-176; IEEE.

Liu et al.; "Optimal Multivariate Control for Differentiated Services on a Shared Hosting Platform"; Proceedings of the 46th IEEE Conference on Decision and Control; bearing a date of Dec. 12-14, 2007; pp. 3792-3799; IEEE.

Wang et al; "AppRAISE: Application-Level Performance Management in Virtualized Server Environments"; bearing a date of Dec. 2009; pp. 240-254; vol. 6, No. 4; IEEE.

Chen et al.; "Log-Based Architectures for General-Purpose Monitoring of Deployed Code"; bearing a date of Oct. 21, 2006; 3 pages; ACM.

Realtime Privacy Monitoring on Smartphones; located at appanalysis.org; (retrieved on Oct. 8, 2015) created on Dec. 2, 2015; pp. 1-2.

Enck et al.; "TaintDroid: An Information-Flow Tracking System for Realtime Privacy Monitoring on Smartphones"; Proceedings of the 9th USENIX Symposium on Operating Systems Design and Implementation (OSDI), Oct. 2010. Vancouver, BC.; created on Dec. 2, 2015; pp. 1-15.

* cited by examiner

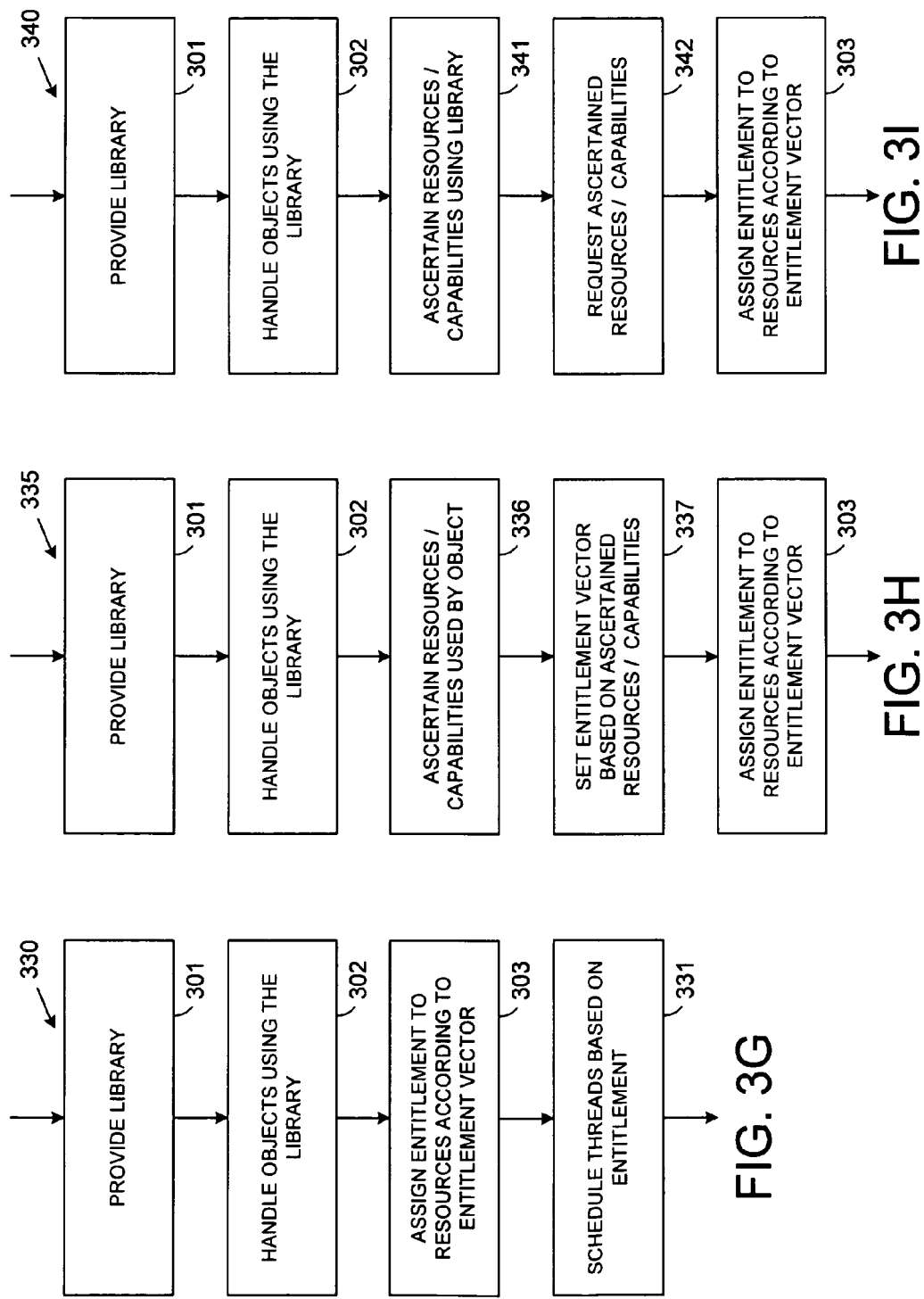

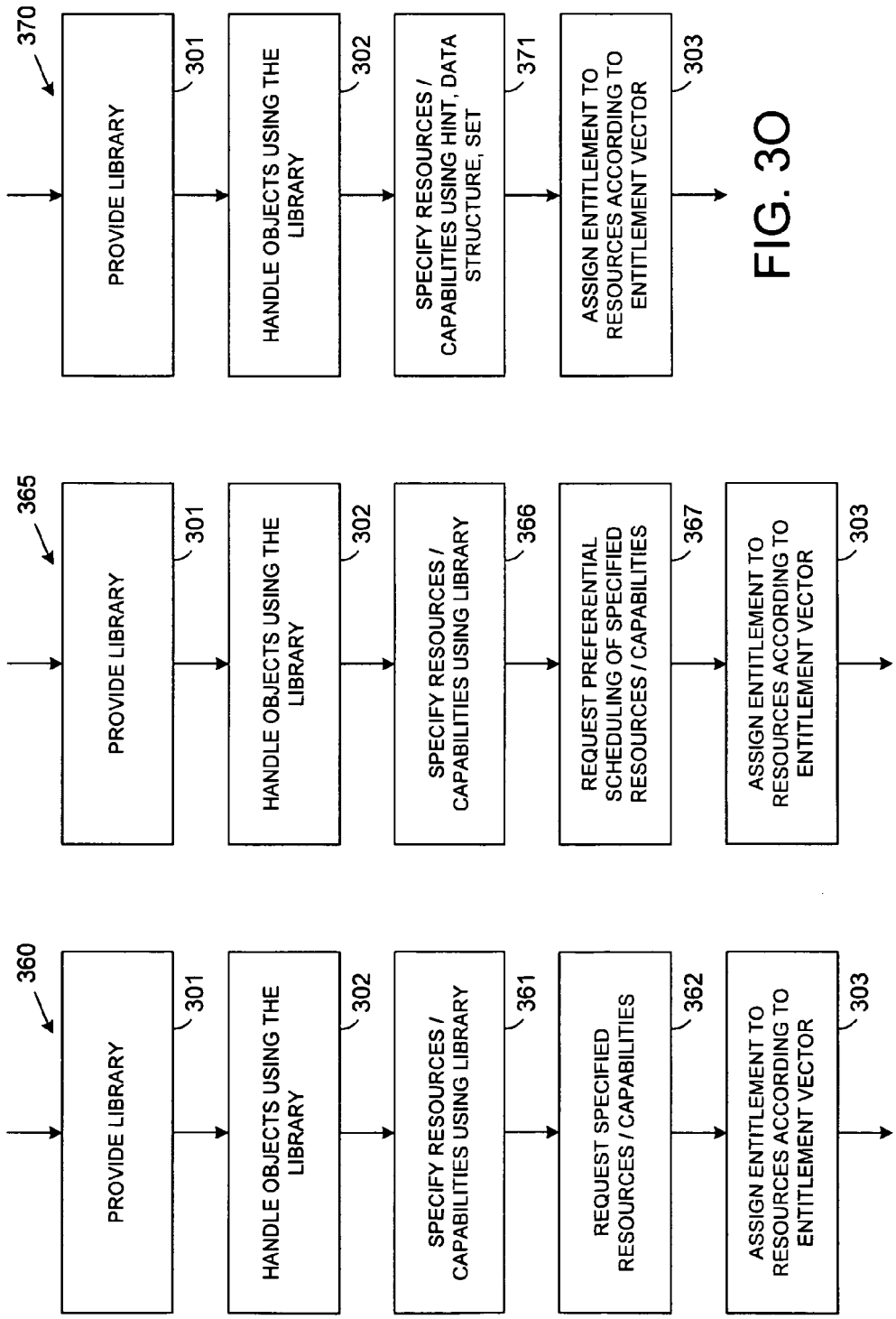

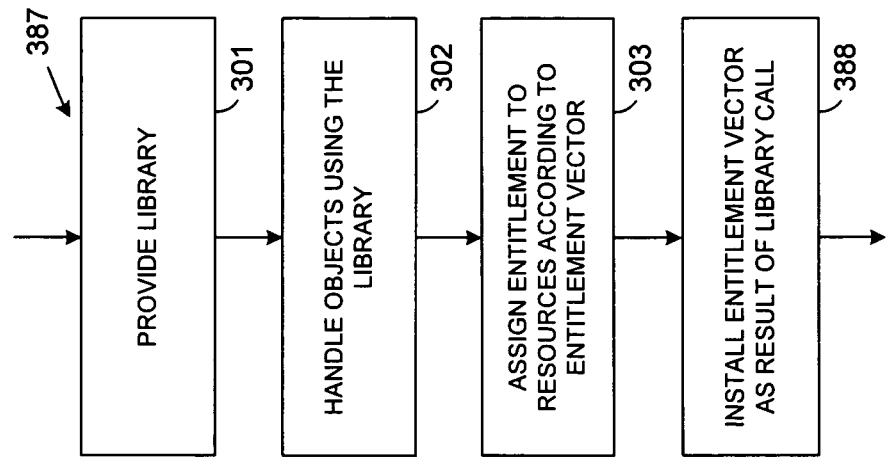
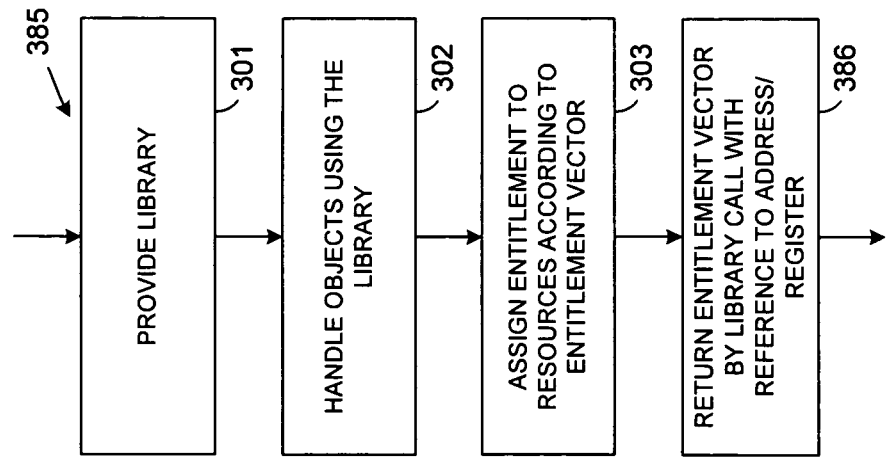
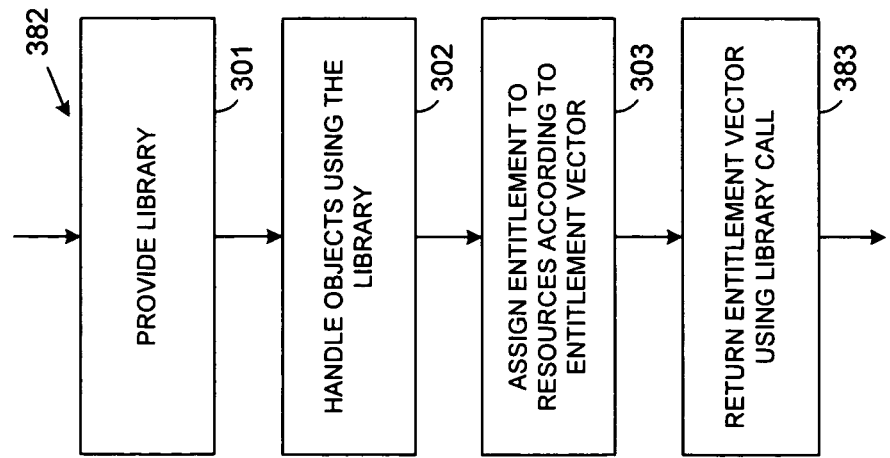

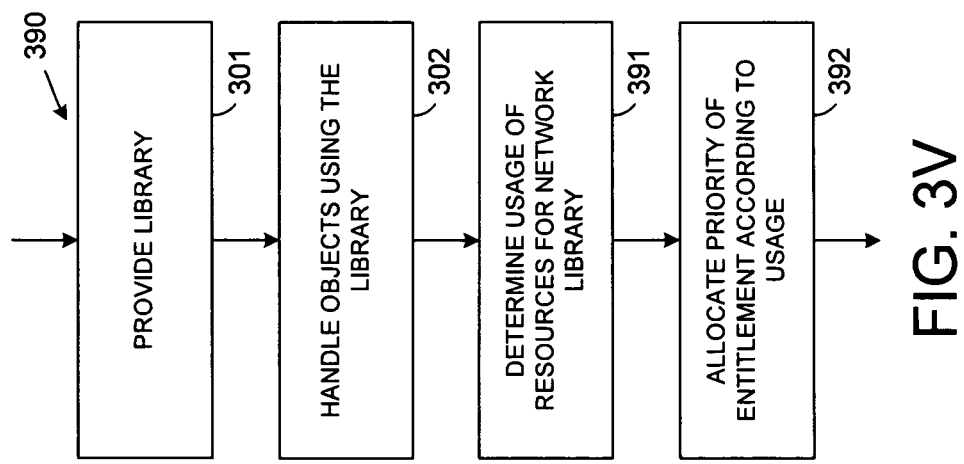

ENTITLEMENT VECTOR FOR LIBRARY USAGE IN MANAGING RESOURCE ALLOCATION AND SCHEDULING BASED ON USAGE AND PRIORITY

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements:
(1) the present application constitutes a continuation-in-part of U.S. patent application Ser. No. 13/136,024, entitled "CONTROL FLOW INTEGRITY", naming Andrew F. Glew, Daniel A. Gerrity, and Clarence T. Tegreene, as inventors, filed Jul. 19, 2011, which is currently co-pending, or is an application of which a currently co-pending application is entitled to the benefit of the filing date;
(2) the present application constitutes a continuation-in-part of U.S. patent application Ser. No. 13/136,401, entitled "FINE-GRAINED SECURITY IN FEDERATED DATA SETS" naming Andrew F. Glew, Daniel A. Gerrity, and Clarence T. Tegreene, as inventors, filed Jul. 29, 2011, which is currently co-pending, or is an application of which a currently co-pending application is entitled to the benefit of the filing date;
(3) the present application constitutes a continuation-in-part of U.S. patent application Ser. No. 13/136,400, entitled "ENCRYPTED MEMORY" naming Andrew F. Glew, Daniel A. Gerrity, and Clarence T. Tegreene, as inventors, filed Jul. 29, 2011, which is currently co-pending, or is an application of which a currently co-pending application is entitled to the benefit of the filing date;
(4) the present application constitutes a continuation-in-part of U.S. patent application Ser. No. 13/136,666, entitled "SECURITY PERIMETER" naming Andrew F. Glew, Daniel A. Gerrity, and Clarence T. Tegreene, as inventors, filed Aug. 4, 2011, which is currently co-pending, or is an application of which a currently co-pending application is entitled to the benefit of the filing date; and
(5) the present application constitutes a continuation-in-part of U.S. patent application Ser. No. 13/136,670, entitled "PROCESSOR OPERABLE TO ENSURE CODE INTEGRITY", naming Andrew F. Glew, Daniel A. Gerrity, and Clarence T. Tegreene, as inventors, filed Aug. 4, 2011, which is currently co-pending, or is an application of which a currently co-pending application is entitled to the benefit of the filing date;
(6) the present application constitutes a continuation-in-part of U.S. patent application Ser. No. 13/199,368, entitled "INTRUSION DETECTION USING TAINT ACCUMULATION" naming Andrew F. Glew, Daniel A. Gerrity, and Clarence T. Tegreene, as inventors, filed Aug. 26, 2011, which is currently co-pending, or is an application of which a currently co-pending application is entitled to the benefit of the filing date;
(7) the present application constitutes a continuation-in-part of U.S. patent application Ser. No. 13/200,547, entitled "INSTRUCTION SET ADAPTED FOR SECURITY RISK MONITORING" naming Andrew F. Glew, Daniel A. Gerrity, and Clarence T. Tegreene, as inventors, filed concurrently herewith on Sep. 24, 2011, which is currently co-pending, or is an application of which a currently co-pending application is entitled to the benefit of the filing date;
(8) the present application constitutes a continuation-in-part of U.S. patent application Ser. No. 13/200,557, entitled "RESOURCE ALLOCATION USING ENTITLEMENTS" naming Andrew F. Glew, Daniel A. Gerrity, and Clarence T. Tegreene, as inventors, filed concurrently herewith on Sep. 24, 2011, which is currently co-pending, or is an application of which a currently co-pending application is entitled to the benefit of the filing date; and
(9) the present application constitutes a continuation-in-part of U.S. patent application Ser. No. 13/200,556, entitled "RESOURCE ALLOCATION USING ENTITLEMENT HINTS" naming Andrew F. Glew, Daniel A. Gerrity, and Clarence T. Tegreene, as inventors, filed concurrently herewith on Sep. 24, 2011, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

BACKGROUND

Resource allocation in data processing and computing is used for applications to run on a system. A program initiated by a user generates a process. A computer allocates resources for the process to be run. Typical resources include access to a section of computer memory, data in a device interface buffer, one or more files, a suitable amount of processing power, and the like.

A computer with only a single processor can only perform one process at a time, regardless of the number of programs loaded by a user or initiated on start-up. Single-processor computers emulate the running of multiple programs concurrently because the processor multitasks, rapidly alternating between programs in very small time slices. Time allocation is automatic, however higher or lower priority may be given to certain processes with high priority programs typically allocated either more or larger slices of processor execution time.

On multi-processor computers, different processes can be allocated to different processors so that the computer can truly multitask.

SUMMARY

An entitlement vector may be used when selecting a thread for execution in a multi-threading environment in terms of aspects such as priority. An embodiment or embodiments of an information handling apparatus can comprise a library comprising a plurality of functions and components operable to handle a plurality of objects. The information handling apparatus can further comprise an entitlement vector operable to assign entitlement to at least one of a plurality of resources to selected ones of the plurality of functions and components.

BRIEF DESCRIPTION OF THE DRAWINGS

Embodiments of the invention relating to both structure and method of operation may best be understood by referring to the following description and accompanying drawings.

DETAILED DESCRIPTION

Figure 1A:
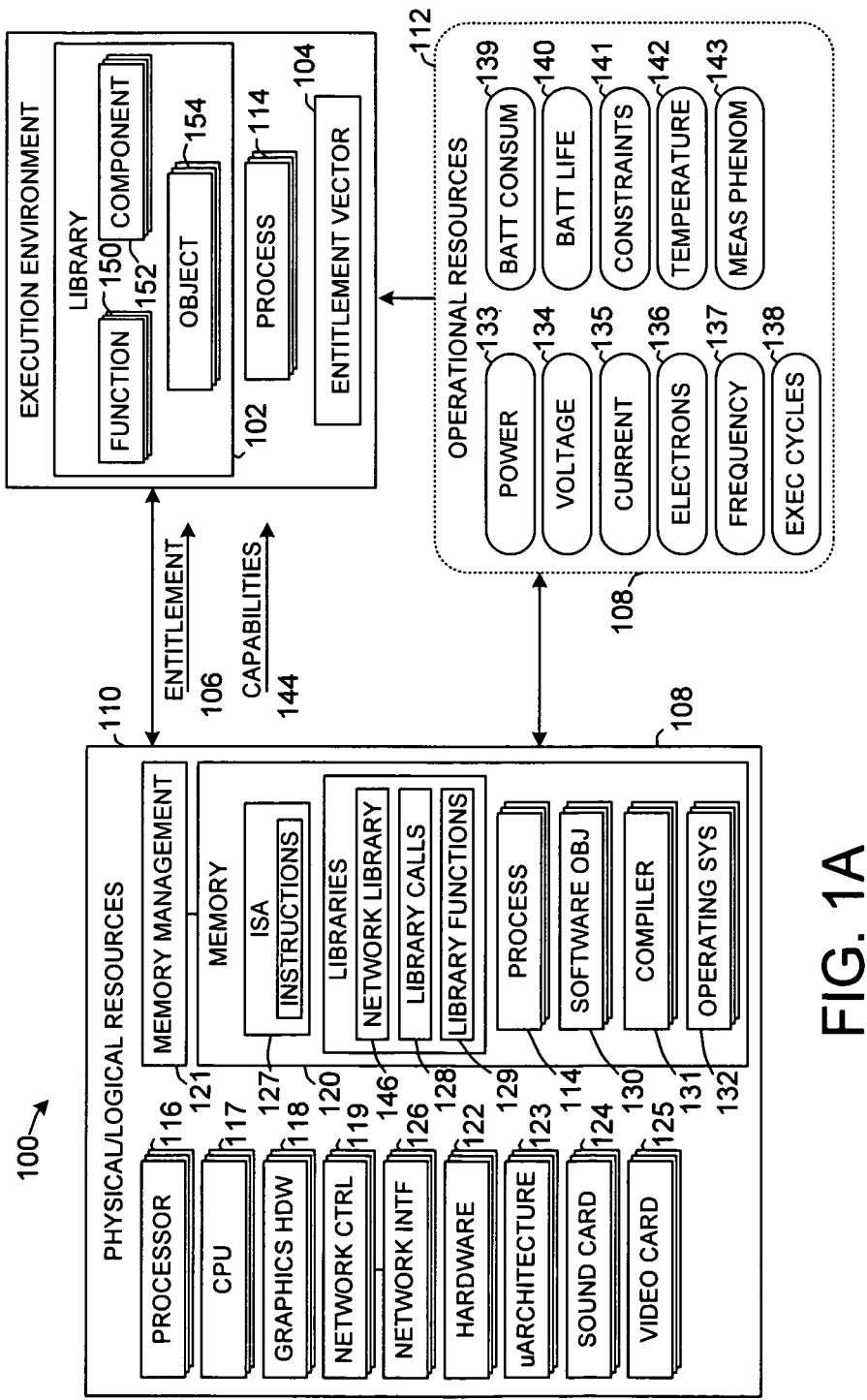
FIGS. 1A, 1B, 1C, and 1D are schematic block diagrams showing embodiments of an information handling apparatus adapted to facilitate resource allocation.

In various embodiments, computer systems and associated methods can be configured to include one or more of several improvements that facilitate resource handling.

Various aspects of resource allocation include hardware threading, computational limits, pooled resources, entitlements, and others. Resource allocation can be handled via various architectural aspects of a system including microarchitecture, instruction set architecture (ISA), operating system, and library calls. Software can associate capabilities with particular library functions or software objects. This software can be in the form of compiler, operating system, or others. The operating system can, for example, create a profile for any process running floating point operations and give that entitlement. Resources allocated include processors, central processing units (CPUs), graphics hardware, network controllers, memory, memory management, other hardware, and the like. Resources further include power, cycles, and the like.

Entitlements can be used to allocate resources. Entitlements can be defined as user-specified rights wherein a process is entitled to a predetermined percentage of power or of time. A scheduler or chooser can monitor entitlement values and schedule the next highest priority process. A particular scheme can allocate modulo by bit to avoid starving a process with lower entitlement. In some conditions, the level of entitlement can be overridden or adjusted. Entitlement can be set according to a predetermined algorithm which defines a "fair share" for the processes, for example round-robin, history-based, randomized, and the like, which are efficient since a large history need not be accumulated. Thus, an efficient and inexpensive hardware implementation is possible.

A metric can be specified which enables modification of a goal. A selected level of entitlement to resource consumption can be assigned to each process. One example scheme can be a short, low complexity method which is implemented while storing a limited operation history. For example, when running low on battery charge, a sequence 1-2-3-4-4-3-2-1 can be used to determine whether any of the processes is a resource glutton and can rank the processes on order of gluttony. The most gluttonous can be assigned the lowest priority. Another option can rank processes according to gluttony in combination with another factor of goodness (niceness). Processes can be ranked for the next cycle with the most gluttonous given last priority or can be ranked according to gluttony and one other nice system criterion. Monitoring and/or control can be performed highly efficiently if hardware, although either monitoring can be performed either in hardware or software in various embodiments. Power management units in CPUs can be used for monitoring, for example to monitor for increases or decreases in voltage or frequency, and for thread execution selection.

Capabilities can be used to perform monitoring and allocation of resources. For example, granting the capability to run video processing software can be combined with simultaneous granting of power capability.

Power is typically global to a process or to an individual CPU. Use of capabilities enables more refined control of power, for example power can be made specific to an object or library routine. With power global to a process, the process will continue to run in absence of a fault, a page fault, a disk access, or the like, and will run until blocked by the operating system scheduler, allowing high power consumption. Use of capabilities enables power to be controlled on a per-hardware thread granularity. Use of capabilities further enables power to be controlled specific to a per-hardware thread granularity for throttling power.

Processors can use instruction prefetch to improve execution speed by reducing wait states. The processor prefetches an instruction by request from main memory before the instruction is needed and, when retrieved from memory, placing the prefetched instruction in a cache. When needed, the instruction is quickly accessed from the cache. Prefetch can be used in combination with a branch prediction algorithm which anticipates results of execution to fetch predicted instructions in advance. Prefetches conventionally operate independently. In some embodiments, a processor disclosed herein can prefetch according to holistic monitoring of operating conditions such as voltage, frequency, and the like to more accurately determine or predict which instructions to prefetch.

The cache can be reconfigured dynamically, for example beginning with a single large, slow cache which can be divided into a relatively small subcache and a larger subcache to enable faster operation. In embodiments disclosed herein, operating characteristics can be monitored to generate information for dynamic reconfiguring of the cache. As a result of the monitored operating conditions, the cache can be selectively configured for slower or faster speed, larger and smaller cache subregions. In some conditions, part of the cache can be temporarily disabled, for example to save power. Monitoring of operating conditions can enable a suitable balance of considerations to determine whether part of the cache is to be disabled, for example determining whether the power saved in disabling part of the cache is appropriate in light of the power lost with a greater cache miss rate.

Disclosed system and method embodiments can use operating condition monitoring and holistic control at the level of calling an object. In an object-level paradigm, various objects or values (such as numbers, symbols, strings, and the like) can be combined to form other objects or values until the final result objects or values are obtained. New values can be formed from existing values by the application of various value-to-value functions, such as addition, concatenation, matrix inversion, and the like. Various objects have different impacts on system operations.

An example of an object which, when called, can have large consumption of power or other resources is video encoding which is a brute force, unintelligent algorithm which runs much more efficiently on dedicated hardware than a general CPU, and has real-time constraints. Video conferencing has similar real-time constraints.

Another object example is video games which perform many different tasks concurrently including processing geometry and processing video simultaneously, possibly processing speech for Skype communications, voice compression, input/output, and the like. Video games thus typically involve concurrent operation of multiple objects such as the game processing tasks and interface (Application Programming Interface, API) that perform different actions separately. The multiple objects are commonly run as separate threads, unless prohibitive due to the large amount of overhead in running threads that are not essential. Separate threads simplify programming.

In some configurations, applications, and conditions, multiple threads can be run wherein the threads need not be run in the same context.

Hyperthreading is a particular implementation of hardware threading. Software threading is a slightly different implementation of threading wherein the threads are often, but not always, related. In some implementations, a processor can include a GOAL register that can be used to set performance characteristics for particular threads. For example, if different routines (Skype, physics) are run in different threads, selected operating characteristics for the threads can be loaded into the GOAL register to give the threads separate issues. Allocating priority to the different threads can be difficult. In an illustrative system, priority to the threads can be allocated using a NICE utility which specifies acceptable performance for a particular operation and allows reduced priority in appropriate conditions for tasks that can be assigned lower priority with little or no consequence.

In an example implementation, priorities, particular types of priorities, and entitlements can be associated with particular library routines to facilitate management of relatively heuristic phenomena. A library can be constituted wherein entitlements are assigned to individual library routines. The library includes information for adjusting the priority of threads. In some configurations or applications, the library can support hint vectors, such as branch prediction hints to specify whether static prediction should be taken or not taken. In some embodiments, the library can be configured to support NICE-type handling of a hint vector.

A process scheduler can be constituted to support prioritized entitlements and resource allocations upon calling selected libraries. A typical embodiment includes such support in software, although hardware support can also be implemented. For example, a network library can include library routines adapted for heavy network usage so that resources giving access to the network are more important processes to schedule. More entitlements are allocated to network-related resources. Libraries can also be configured to handle secondary priorities that change dynamically. For example, a sound card can have a greater power priority and have a pattern of operation wherein a process uses a network card and possibly other subsystems in combination with the sound card. Thus, the network card and other subsystems can also be allocated a higher priority. Similarly, for a process which performs less modeling and number computation in lieu of higher input/output operations and sending of information, a higher level of priority can be allocated to input/output resources.

Entitlements can be used to specify operations of a library. For example, a library with entitlement to run a predetermined number of floating point operations per second can, in response to a condition of executing instructions with few or no floating point computations, use the condition as a hint to power down floating point hardware, thus saving power. Thus, if computations include fixed point operations but no floating point operations, an a priori indicator can be generated designating that the floating point hardware is not needed in the near future and can be powered down. A process can call a library and, if known that a resource is not needed, the resource can be temporarily halted, thereby changing the entitlement level of that process with respect to the resource (for example a floating point unit) to a very low point.

In the illustrative example, the entitlement level of the process with respect to the floating point unit can be changed to very low because the resource is not needed for a foreseeable duration. The process thus indicates to other processes a willingness to relinquish access to the source, for example a willingness to be "nice" about allowing others to use the resource, so that access is deferred in favor of any other process that uses the resource, or the resource is shut down if not currently needed by another process.

Rather than have hardware determine demand for a resource after instructions have been executed, the illustrative system and method can use a call to a library or the result of making a call to the library as an indicator of entitlement niceness. This entitlement can be enforced in the manner of capabilities, for example by requesting access to a memory region, a request which may be denied. The library can give information regarding entitlement, thus giving a priori knowledge.

Resource allocation can also be managed using hints. An illustrative instruction that uses a hint is a hint that not much floating point computation is to be performed, a hint indicative of power demand. For example, hints to maintain power at a low level or to maintain power at a high level. An exception can create problems when using hints, since a hint is not unwound in the event of an exception. For example, for a hint to maintain high power, an exception which changes the condition but does not reset the hint allows hardware to remain in a high power mode, potentially forever. Examples of problems with hint processing in conditions of context switching include problems with unlocking memory locations.

In contrast to entitlements, capabilities enable mechanisms to unwind.

Entitlement Vector.

An entitlement vector may comprise multiple fields that are respectively directed to multiple different resources or capabilities. General examples may include, for example, floating point, power, arithmetic logic unit (ALU), graphics triangle computations, translation lookaside buffers (TLBs), virtual memory usage, and the like. The entitlement vector can thus be used, for example, to power down the TLB as no longer relevant to operation, or to enable usage of a wide range of virtual memory. Software can determine values for each of these fields, for example after monitoring, or the fields can be preconfigured. To maintain in hardware, an entitlement vector may be a suitable size, such as 256 bits. Values can be Boolean. Otherwise, values can be a number from a numerical range to indicate how much from a percentage or relative sense of a given resource is being requested. For example, a big number may be placed in an ALU field if significant usage of the ALU is expected.

Libraries or other objects (and associated threads) can request entitlements. Objects use resources to execute. For example, a networking library has greater usage of a network resource than other libraries or objects. Particular entitlements may be assigned to individual library routines using an entitlement vector, which can indicate expected capabilities to which an object may be entitled. Entitlements may be assigned via the entitlement vector. An entitlement vector may be used when selecting a thread for execution in a multi-threading environment in terms of aspects such as priority.

In some embodiments, an entitlement vector can be used as a hint for an object. Software or a manual determination can ascertain and/or specify what resources/capabilities are to be used by an object, such as a library. Code may be included, for example at the beginning of a library, to request particular resources in the form of an entitlement vector. The request may be a request for preferential scheduling, especially with regard to resources. Such code may be a hint, a data structure, a set of one or more bits, or the like in the library.

In some embodiments and/or applications an entitlement vector can be operable as a repercussion of a calling library. An entitlement vector can serve as a request for resources. The request may be realized as a call to a system call, such as a request to the operating system to allocate additional resources. A hint instruction can be provided to hardware, for example for hardware to use in scheduling. When a library call is made, an entitlement vector may be returned. An entitlement vector can be returned directly or by reference to an address/register location. Otherwise, an entitlement vector may be installed, for example in association with a register, as a result or side effect of making the library call.

An entitlement vector can be configured to handle field of scale. Human perception is limited. For data representing phenomena that are to be perceived by humans, the data size may be limited so that precision beyond what is human-perceptible may be omitted to conserve resources. Accordingly, a requested data resource can be scaled down or set to a maximum size. For example, finger prints do not require greater than 2 MB, and eyes can discern only "x" amount of resolution. Scale may also be applied to other parameters having a relevant precision that is constrained by the physical world. Thus, a field of the entitlement vector can specify scale. Examples of scale can be human scale, width of the accumulator, or any suitable scale. For example, for a finger print, a suitable scale can be no more than 2 MB.

The entitlement vector field can have a suitable predetermined data path width. Communication and computational data path widths may be large to accommodate data-intensive activities. A data path width entitlement vector field may request a reduction to or only a portion of a maximum available data path width. For example, perhaps only 128 bits of 1024 bits are needed. The other bits of the non-used data path width may be shared with another process or shut down to conserve energy. For example, a portion of a power-hungry super accumulator may be powered down in response to a data path width indication in a field of an entitlement vector. Thus, a field of the entitlement vector can be data path width, a similar concept to scale. A large instruction size, for example 1024 bits, wastes power, but typically only a portion of the bits are used at one time so that a desired subset of the bits can be activated, changing the data path width. The scale concept leads to the concept of a selected partial data path width. The data path width is part of the entitlement. For example, of 1024 bits logic can compute the number of bits actually needed and allocate that predetermined subset of bits, such as 128 bits. The data path field thus can be used to lower the data path width used of the available entitlement vector width, for example activating a super-accumulator data path width.

An entitlement vector can also be used to supply information for scheduling. Individual instruction pointers or threads can be associated with an entitlement vector. For example, four instruction pointers (IPs) can be associated respectively with four entitlement vectors. Logic for a thread chooser can schedule a next thread for execution based at least partly on an entitlement vector. Hence, an entitlement vector may affect priority of scheduling. For example, a glutton with low priority may be moved toward the back of a queue. A miserly resource user with a high priority, on the other hand, can be moved toward the front of the queue.

The entitlement vector can enable usage of selected scheduling functions. Different functions can be used to schedule threads with regard to entitlement vectors. Generally, a function (i) can be based at least partly on: a weight$_i$, an entitlement vector$_i$, and a usage level$_i$. A function can be, but is not necessarily, linear. For example, a sum of a product of a weight times an entitlement vector may be compared to a usage vector when considering priority for scheduling threads.

An entitlement vector and usage vector can be mutually associated. An entitlement vector for an object can be set by software. A usage vector may be determined by hardware by monitoring resource usage during execution. An entitlement vector and a usage vector can be combined into an uber-priority vector that can be used when scheduling threads.

In an example software embodiment, software can monitor the system over history, or can be preprogrammed, and fills in some sets in entitlement vector fields. Software can determine values for the fields and fill in the bits of data, possibly associated as a lookup table, an associated hash table, an extra field to call for a library, and the like. For a library call, an entitlement vector EV is returned. The entitlement vector can be received from various sources, for example from external to calling software. For example, the entitlement vector EV may be installed into hardware as a side effect of the library call.

A factor in determining whether the entitlement vector is handled in software or hardware is the size of the vector.

In an example hardware implementation, a suitable entitlement vector size is 256 bits, although any suitable size is possible. For example, a vector of 64K bits is generally considered too large for hardware implementation.

In some embodiments, an entitlement vector can be associated with each library. The entitlement vector can be used, for example, to eliminate floating point if desired, reduce the number of floating point operations if such operations are rarely used, reduce the scale as appropriate when full accumulator width is unnecessary, increase support for the ALU.

The entitlement vector can be implemented as a call with a memory address made in association with a call to a library which, for example, can return a pointer or address location to the entitlement vector.

Another field of the entitlement vector can be a chooser/thread selector. The entitlement vector can be used by the chooser/scheduler, which includes logic that performs operations based on a single entitlement vector or possibly relative entitlement vectors. Each Instruction Pointer (IP) or thread can have an associated entitlement vector. For example instruction pointers, for IP1, IP2, IP3, IP4, then four entitlement vectors can be allocated. Chooser/scheduler logic considers the entitlement vector when scheduling the next thread for computation. The logic informs the chooser/scheduler about how to make the selection. The logic can perform selected functions to make the choice and for scheduling, for example by elevating or decreasing priority of a thread.

An example function using an entitlement vector (EV) can compute the sum of weight times $EV_i$ compared to the usage vector of Thread, a simple target function for evaluating when to schedule threads from the highest priority to the lowest priority. Thus, for a thread with high priority and large requirement for resources, the thread can be elevated in the scheduling list and resources are likely to be allocated. In contrast, a thread that is a glutton for resources and has low priority is likely to be deferred by the scheduler, moving back or to the end of the list of scheduled threads. A high priority thread that consumes only limited resources is likely to be moved up in the schedule list, possibly to the front of the list.

In some embodiments, the entitlement vector supplied by a HINT instruction can be modified by a capability process. Illustratively, the entitlement vector can set entitlement to use X resources which can be limited by the operating system for example by reduced weighting or setting of maximum allowed resources. The entitlement vector can also be limited according to usage, wherein a thread using an inordinately large amount of resources can be limited when the high usage is detected or predicted.

The entitlement vector function $F_i(w_i, EV_i, v_i)$ of weight ($w_i$), entitlement vector ($EV_i$), and resource volume ($v_i$) can be either linear or non-linear.

The entitlement vector enables association of scheduling with functions. The entitlement vector further enables association of priority with functions.

One of the challenges in allocating resources is the potential for highly unpredictable changes in resource demand. For example, minor changes in workload can result in substantial variation in performance. Another challenge is unpredictable behavior in response to context switches from one process to another. One technique for dealing with these challenges is making a library call as a technique for determining whether a context switch occurred or, if not expecting to make a library call, perform an action that randomizes priority. If degradation results from making the library call, then performance can be monitored to determine whether performance is reduced. If so, priority of the threads can be randomized. Example techniques for randomization can include a Boltzmann search, simulated annealing, hop-around, other lateral computing techniques, and the like. A Boltzmann search can be performed by a Boltzmann machine, a stochastic recurrent neural network that is capable of learning internal representations and solving combinatoric problems. Simulated annealing is a computer technique used for answering difficult and complex problems based on simulation of how pure crystals form from a heated gaseous state. Instead of minimizing the energy of a block of metal or maximizing strength, the program can minimize or maximize an objective relevant to the problem at hand, specifically randomization to attain stable performance. In a hop-around technique, priority or other parameters can be bounced around to determine a local maximum but not global optimum. Search optimizations can be used to determine whether truly at a maximum value. The new results can be compared with an old optimum.

In some embodiments, a supervisor circuit, for example for thermal and/or overvoltage protection, can modify the entitlement vector.

Entitlement Vector for Power Control Monitoring.

The entitlement vector, for example in combination with a usage vector, can be used for monitoring power control. In various embodiments, power control monitoring can be performed remotely or locally, possibly by the operating system.

In an example embodiment, a user can supply an entitlement vector using instructions, for example by specification of the beginning and end of a function. The entitlement vector can be used in association with a performance monitoring unit which monitors and determines other entitlement vectors. In various embodiments, the entitlement vectors can be maintained separately or combined into a single effective entitlement vector.

Context Switches.

Context switches can be defined as switches from one process to another. In contrast, a thread can typically be considered limited to a single context. Standard threads and mock threads share resources including context and can have multiple processes, multiple threads within the same privilege level technically. However, a threading library and threading operating system can be created wherein threads are not limited to the same context. Threads can comprise simply a stack and an instruction pointer, and can run in the same address space, for example threads can run as different users in the same address space. In a case of multiple users accessing the same database, if the database is a shared-memory database, software or an interpreter can be responsible for ensuring that unauthorized user(s) cannot access certain data. In the case of users assigned different privilege levels or different threads in the same virtual memory address space assigned different privilege levels, different registers are assigned to particular users and/or threads, and thus switches between users and/or threads are context switches.

Privileges can be associated with a page, a page table, an actual physical memory address, a virtual memory address, and the like.

Combining capabilities and entitlement.

In some embodiments, the capabilities vector and the entitlement vector can be merged. In some aspects of operation, entitlement can be considered to be a capability. With entitlements specified, the associated performance capabilities and management of associated capabilities prevents unauthorized access to data and/or resources, and prevents system takeover, unless specifically allowed or enabled by a system call, improving security and enabling denial of service to attacks.

Merged capabilities and entitlement can be used to prevent microarchitectural denial of service. Denial of service is typically considered to arise from a hacker on a network blocking access by using up all or a substantial part of network bandwidth. For example, when operating on a virtual machine in a cloud computing platform (such as Amazon Elastic Compute Cloud (EC2)) a job can be run that thrashes the cache, resulting in an architectural denial of service in response. Preventative remedies can include checking for performance counters and preventing such unauthorized accesses. Microarchitectural remedies can also be used such as implementing microarchitectural covert channels in which, for various types of code, secret keys running on the same virtual machine can be detected. Similarly, microarchitectural covert channels can be used to monitor timing of code to detect intrusion and to detect whether a bit is set in a particular bit position which may indicate intrusion. Microarchitectural techniques can thus include timing channels and covert channels for use whenever a shared resource is to be modulated. Covert channels can be applied, for example, in modulating a disk arm, detecting seeks on a file system.

In various embodiments, operations implementing and using the entitlement vector can be executed by software in a processor, by microcode, in logic, in hardware, or the like.

Hardware Threading.

Several aspects of hardware threading are currently implemented in processors such as CPUs. Simultaneous threading (SMT), hyperthreading, or simultaneous hyperthreading relate to hardware execution of two or four threads selected for running at any time, managed according to many fine-grained scheduling decisions. In a cycle, two threads are selected at instruction fetch, typically at the front of the pipeline and hardware determines which of the two thread's instructions to fetch. An instruction for each of the threads pass to an out-of-order machine within which the instructions are running concurrently. For example, an arithmetic logic unit (ALU) instruction from thread 1 and a memory instruction from thread 2 can run simultaneously.

Another type of hardware threading is interleaved multithreading (IMT) which removes all data dependency stalls from the execution pipeline. One thread is relatively independent from other threads so the probability of one instruction in one pipeline stage needing an output from an older instruction in the pipeline is low. IMT is conceptually similar to pre-emptive multi-tasking used in operating systems.

In contrast to CPU multithreading which handle relatively few threads (typically two or four threads), graphics processing units (GPUs) are stream processors for computer graphics hardware and manage hundreds or thousands of threads, thus using much more sophisticated scheduling. When blocking occurs, for example on a cache miss such as from a memory reference, a very large number of threads are blocked. Threads are chosen for execution on massively parallel thread arrays. In a typical arrangement, a processor has approximately 64,000 threads of which only about a thousand execute at one time. Underlying operations during execution include scheduling, addressing cache misses, and the like. Rather than scheduling from a memory pool, GPUs schedule instructions for execution from a very large pool of threads, waiting for memory to become available to run the next thread.

A CPU can be configured for a CPU thread hierarchy which includes a currently running list and a pool of non-running threads enabled to receive information pertinent to computational limits from devices or components such as special-purpose hardware.

Computational Limits

A limit on computation can be imposed according to setting of priority level which is, in turn, based on available resources. One example resource that can be monitored to set limits on computation is the battery. Limits on computation can be imposed based on battery consumption, battery life remaining. Computational limits can be addressed via a framework of setting capabilities, for example specifying a capability to execute on selected processing resources. In an example implementation, the capability can be set up in metadata.

Addressing computational limits can be fairly complex, involving not only information from monitored resources but also user input. For example, a determination by hardware of low battery level and associated limited battery life can be overridden by a user who may request a software application to run in anticipation of being able to soon recharge the battery at a line power source.

Performance Capabilities

A performance capabilities framework can be defined to address handling of a pool of available resources. A thread pool pattern can be configured wherein a number of threads are created to perform a number of tasks which are typically organized in a queue. Usually, the number of tasks is greater than the number of threads. A thread upon completing an associated task will request the next task from the queue until all tasks have completed. The thread can then terminate or become inactive until new tasks are available. The number of threads can be tuned to improve performance, and can be dynamically updated based on the number of waiting tasks. Increasing the size of the thread pool can result in higher resource usage.

A hardware scheduler can respond to any countable or measurable operating condition or parameter, for example electrons, constraints, frequency, cycles, power, voltage, and the like, to control the thread pool and pool of resources. Two highly useful conditions or parameters for monitoring are power and cycles, which are the basis for other measurable phenomena. Monitoring of operating conditions can be performed in hardware or via software call.

Furthermore, software can associate capabilities with particular objects such as libraries.

In an example embodiment, a software model can be configured to use and enforce performance capabilities. In a relatively simple operation, if power is too low, then the software can limit the maximum number of threads or other capabilities. For example, in a cell processor case the number of threads can be limited to less than 1000. Fundamentally, software can disable functionality if sufficient power is unavailable for scheduled operations.

In another example, a sensor or sensors can detect whether battery bias voltage level is recovering too slowly or, similarly, a thermistor can indicate a battery is too hot which may indicate operating at too aggressive a level. A bit or bits can be set indicating the recovery time is too long. The set bit(s) can be used to throttle the maximum thread hopping rate in the case of a CPU with two threads. The bits disallow a thread hop and set an allowable rate of thread hopping; or perhaps allow thread hopping which creates slowing but saves power.

An example of performance capability monitoring and management can be implemented in a CPU with four process threads each having instruction pointers. One of the four threads is selected to execute for next instruction cycle. Various types of information can be monitored to determine which thread to select including recent demand for power, memory, CPU cycles, and the like. For example, a process can be a resource glutton and allocated fewer resources to enable other processes priority. Information is available relating to recent performance, requested performance, and acceptable performance (niceness).

Another option is to use a "NICE" instruction which can be used to adjust the priority level of predetermined instructions, enabling the instructions to be run in the background at a convenient time. For example, if a processor or battery is running too hot, the NICE instruction can reduce the urgency of executing code. In a particular example implementation, the NICE instruction can change a multiplier and step of a decay algorithm.

High and low capabilities can be specified. For example, a particular software routine can sometimes, although rarely, use floating point operations so the capability for such routines can be set low. Operations performed by software can include monitoring, configuring parameters, and the like.

A predictive hint can also be used to allocate resources. For example, a software routine can use a hint a prediction of a significant amount of floating point usage. A HINT instruction can be included in the routine. In another version, at the beginning of a library function, code can be inserted to enable predictive preferential scheduling. The HINT instruction can be part of the library, for example at the beginning, or associated with the library. Code can be inserted in the library, such as at the beginning of a library function requesting particular resources, for example for preferential scheduling. In one example form, a call to a system call can request the operating system to allocate more resources. In another example form, a hint instruction can be sent to hardware to implement the hint and the hardware responds by using the hint in hardware scheduling, such as push, pop, pull, stack, or the like. The hint instruction typically has no direct effect on program execution. The program will run correctly except for changes in performance and battery life.

Predictive hints can also be implemented other than with a hint instruction. Rather than an instruction, the hint may be part of the data structure. For example, X number of bits can relate to expected capabilities to which a process can be entitled such as a vector or a structure. Software can determine information for a performance descriptor, then fills in the data so that metadata of a descriptor determines importance of the performance descriptor.

Accordingly, predictive hints can be implemented in hardware, software, the instruction set architecture, or a combination of configurations. Hardware is typically more constrained than a software implementation. A software library enables the hint to be passed in a linked list of hash trees for passage into hardware, for example as a 128-bit or 256-bit register. Such an implementation can be implemented in an application programming interface (API) but sufficiently simple to be part of hardware. Thus, the API can be designed, then simplified sufficiently to put into hardware.

Capabilities can be used to implement security. Typically, a system has only a few predetermined capabilities. However, a system can be configured in which every memory addressing register is assigned a capability. If the register specifies a capability to access the associated memory location, the location can be accessed. Otherwise, access is prohibited, for example producing a fault or incrementing counter or accumulator which can be noted in an intrusion vector. For any aspect related to security, if a test is failed, the counter is incremented and placed in the intrusion vector.

An instruction can be specified in an instruction set which sets a capability. In various embodiments, the instruction can be implemented in software, hardware, the operating system, or the like. The instruction can operate in association with a capabilities vector. In some embodiments, the instruction can also or otherwise operate in association with a hint vector.

The capabilities vector can be associated with a pointer, an address, and an object. A highly basic capability is a lower bound and an upper bound. Other more complex capabilities can be implemented. In various implementations, the capabilities vector and the entitlement vector can be separate, or can be combined. Merging the capabilities vector and the entitlement vector enables software structuring.

The capabilities vector can be used to enable fine-grained permission. Fine-grained permission facilitates operations of multiple users or entities in a shared memory data base, enabling the multiple users to access storage such as disk and to perform system calls, but limit access to data only to the user who owns the data or is authorized to access the data. Another benefit of fine-grained permissions is an ability to facilitate and improve security while multiplexing software threads onto hardware threads. In an example configuration, 64000 software threads are multiplexed onto only four hardware threads. Only a small portion of the software threads are running at one time with the remaining software threads idle. The software threads alternately run on the hardware threads, then go back to idle to allow other software threads to run.

A classic security hole in a database management is the inability to limit access to data for the different software threads multiplexed onto the hardware threads. A database typically does not allocate a hardware thread to a user. In typical database operation, a request is received and placed on a software thread so that users are multiplexed onto the software threads, an action giving very little protection. Better protection is attained by allocating each user to a separate process, a technique that is prohibitively expensive because the threads are expensive. Multiplexing the users onto software threads leaves a security hole because access to a particular user's data allowed while running the user's software thread on a hardware thread is not removed when the user's software thread is swapped out from the hardware thread. The access permission remains so access remains enabled. The depicted system solves the security hole by using capabilities.

In a non-capabilities system, any of the software threads can access the entire database at any time, including any data that has been placed in shared memory (unless a call out is made through the operating system to enable any of the threads to create I/O, a prohibitively expensive operation). Simple databases only have one peer thread so all threads can access any data. Many typical databases have 64 threads that can access any data in shared memory but only four threads that can access I/O. These systems sometimes have different privilege levels (for example, Intel's rings 0, 1, 2, 3) so specify compatibility. Most code runs in ring 3 and the kernel in ring 0. Rings 1 and 2 are generally not used although several databases have features that can run in ring 1 and ring 2 but are rare and used primarily for benchmarks (a benchmark hack).

In an example implementation that uses capabilities, generally a processor has 16 or 32 registers, some of which are addressing registers. A capability can be loaded to enable access to selected threads. A capability can be loaded to access a particular thread (owned by another user) into hardware thread 0, enabling running as that user. This is one type of context switch—to change the software thread that is executing on hardware thread 0. The capability registers can then be changed, a minor context switch and a change in privilege level. The action does not invalidating translation lookaside buffer (TLBs), but rather moves the permissions out of the TLB. The access control model is also changed. Capabilities can be used in this manner to change operations, guaranteeing only access to data and/or resources for which access is allowed by a permission-granting entity. Capabilities can guarantee a transitive exposure of only the data and/or resources of another user according to granted authorization. The technique is deterministic so that, by inspection, which accesses are possible is known.

Translation Lookaside Buffer TLB.

A translation lookaside buffer (TLB) is a processor cache which can be used by memory management hardware to improve virtual address translation speed. Processors use a TLB to map virtual and physical address spaces. TLB are used widely in hardware which uses virtual memory.

The TLB can be implemented as content-addressable memory (CAM), using a CAM search key which is the virtual address to produce a search result which is a physical address. If the TLB holds the requested address—called a TLB hit, the CAM search quickly yields a match and the retrieved physical address can be used to access memory. If the TLB does not hold the requested address—a TLB miss, the translation proceeds by looking up the page table in a process called a page walk. The page walk is computationally expensive process, involving reading contents of multiple memory locations and using the contents to compute the physical address. After the page walk determines the physical address, the virtual address to physical address mapping is entered into the TLB.

A stream monitoring instruction can improve efficiency and performance of the TLB by supporting a software predictor. The instruction can be used to monitor misaligned or split access. A memory access is aligned when the data item accessed is n-bytes long and the data item address is n-byte aligned. Otherwise, the memory access is misaligned. Monitoring for misaligned access can be performed by hardware, resulting in a trap, or somewhat less efficiently by software. In practice, monitoring for misaligned access has a high false positive rate, for example approaching 90%. A predictor can be configured, for example by microarchitecture adjustment, to indicate whether the misaligned access hits are accurate.

A processor can be configured to change voltage, frequency, and/or power based on the number of cache misses. For example, logic can detect an abundance of cache misses or other performance problems, the voltage can be varied such as increased to cure the problem. The logic can dynamically adjust operating parameters according to the amount of traffic. Frequency and voltage can be adjusted, for example whenever a change in frequency occurs, the voltage can be modified accordingly.

Logic in a memory interface can detect when memory is full to some threshold level, for example 70%. If memory is full to the threshold level and a high level of access is occurring, memory speed can decrease. In response, the frequency and voltage of operation can be dynamically increased to maintain a desired memory speed.

In various embodiments, logic for performing dynamic adjustment can be positioned in memory, in a logic interface, in a processor. A hardware configuration can optimize by active adjustment, redirection, or possibly a combination of adjustment and redirection. For example, a computation-intensive process with many instructions to be executed rapidly can be addressed by running the processor at a higher rate by increasing operating frequency and voltage, and/or some of the burden can be shifted to components other than the processor to maintain processor execution at a lower frequency.

Infrastructure.

An infrastructure configured to support multiple processors in a system can have a shared memory and message passing between threads, processes, processors, and the like. Operating systems (OS) can include various mechanisms to enable message passing, for example pipelines, daemons that use sockets, loopback, and the like. Any suitable number of processors can be supported in the system, from relatively small systems with few processors to large scale systems with hundreds of thousands or millions of processors. In a typical large scale system, the multitudes of processors communicate via fat trees which support the large amount of bandwidth demanded by the large scale system. The amount of bandwidth in different positions in the tree is variable, depending on traffic. In various other configurations, the many processors can communicate via meshes or buses, via Gigabit Ethernet, via CDMA-CE (Code Division Multiple Access—series CE), and the like. In large interconnects, the number of processors determines what functionality is attainable. For example, for more than about 1000 processors, memory can no longer be shared. At around 100 processors, memory space can be shared but cache-coherence is typically not possible and memory is thus non-cache-coherent shared memory. Cache-coherence is generally considered to cause problems for more than about sixteen processors so that fewer processors at a first level can have cache-coherent shared memory.

For a supercomputer or other system with the large number of processors, for example more than about 1000, for which memory is non-shared, Message Passing Interface (MPI) can be used for communication. MPI uses multiple threads but does not use shared memory. The MPI multiple threads are all part of local shared memory, but no global shared memory exists. The amount of local shared memory is limited, resulting in a communications bottleneck. Supercomputer memories use Message Passing Interface (MPI) which, to a first order, includes a limited number of instructions such as send some location, buffer, end buffer, and receive some entity, buffer, end buffer, and the like. MPI is an application programming interface (API) and is thus a library call. The received entity can be, for example, a channel connecting the sender and the receiver, although channels are rarely used in MPI since channels do not scale beyond about a thousand processors. Accordingly, MPI can use commands with masks which identify which processors are to receive a message. A difficulty with MPI is that different code must be written, and a different core engine and interface, for small-scale and large-scale parallelism. Thus, send-and-receive communication such as is used by MPI is suitable if memory is shared.

What is desired is a technique for expanding send-and-receive communication more broadly. In accordance with system and method embodiments, a communications application programming interface (API) can be created that enables communication between different types of threads and hides that the threads are sharing memory. The communications API can enhance functionality of a Transmission Control Protocol (TCP) socket. The TCP socket, also termed an Internet socket for network socket, is an endpoint of a bidirectional inter-process communication flow across and Internet Protocol (IP)-based computer network such as the Internet. In some embodiments, the communications API can also incorporate functionality of MPI into that of a TCP socket. In a distributed system, a processor can communicate with a Network Interface Controller (NIC) and a send instruction puts data on a queue to send to the NIC and pass through the routing network to a specified destination. The communications API can perform communications via TCP-IP, in some configurations optimizing aspects of TCP-IP such as by ordering packets, and also via other protocols. The communications API can include send-and-receive functionality, and include one or more channels, which is operable with TCP-IP. Some of the channels can be shared memory in the form of a buffer with a counter. Some channels can connect to the NIC, some channels to TCP-IP, and some channels can have other functionality. In some embodiments, the communications API can support different types of channels. One example of a channel type is simply registers. Another type of channel can run two hardware threads with a pipeline coupled between the two threads.

The communications API can be adapted to handle the possibility of overflow. For example, for a channel implemented as shared registers, filling the registers to capacity can cause overflow to memory, which can call a trap or exception.

Another technique for expanding send-and-receive communication more broadly can comprise creating a message passing infrastructure in hardware. Speed is one advantage of forming the message passing infrastructure in hardware. For example in the case of a system call, conventionally a slow operation, hardware can be configured to support a send instruction operable to check a bit in a channel selected for the send operation to determine whether the channel is available and, if not, performing a system call by faulting to the system call. Thus, the hardware can be configured to pass execution through the operating system in response to desired conditions.

In an example embodiment, the message passing infrastructure hardware can be configured to avoid passing execution through the operating system, for example to avoid the context switch inherent with going to the operating system. In another example embodiment, the hardware can be configured to include a message passing paradigm and one core can be run in ring 0 to enable access to operating system calls. The operating system is not a separate process but rather a library call in a library. Another option is to allocate a hardware thread to the operating system.

The operating system performs a ring 0 call via a system call which, in terms of hardware implementation, can be a function call to change a bit, granting permission to change the bit, and identification of the stack from which the OS is operating. In one example implementation, the user can explicitly control the stack, for example by placing the operating system stack in a different register. In another implementation, a system call can change the instruction pointer and the stack.

The message passing infrastructure hardware implementation can, for example, include support for send and receive calls. The hardware implementation can enable faster operating speed. For particular special cases, hardware send and receive calls can be faster than a shared library call. Send and receive are global messages, supporting point-to-point communication in two-party messaging. In some embodiments, the hardware implementation can support put and get APIs to enable sending a message to a designated address asynchronously or synchronously, as selected. The designated address is in a global address space partition, not local load-store. The put and get APIs can handle access to shared physical memory by sending a request to the master or server for the designated memory location. The memory is hashed across all the global memory space. In the illustrative implementation, get and put can be system calls rather than instructions, thus facilitating global access. Because the get and put system calls are relatively resource-expensive, efficiency can be attained by communicating blocks of data, for example 64K, at one time rather than for individual bytes.

For a cache-coherent shared memory that is accessed using the put and get system calls, different schemes can be used depending on what entities are communicating. For entities which share memory, the get and put calls simply access the shared memory. For entities separated by substantial physical or network distances, the get and put calls, if unable to fulfill the call by shared memory access, by running through the same router or similar local actions can send the calls to the network interface to relay remotely, for example across the world. For shared memory, whether cache-coherent or cache-noncoherent, the put and get, and send and receive operations are relatively simple since all entities can access the same memory. More complexity arises when memory is not shared. In various embodiments, when memory is not shared different schemes can be used such as copy-on-write (copying the shared memory), creating in remote memory the shared memory that shares the same capability, an implicit in the put and get, or other options.

The message passing infrastructure thus can include hardware support for the various put and get, send and receive, or the like system calls or instructions. The message passing infrastructure can be configured to enable two threads to be forked and used with the put and get calls to enable optimum speed performance. The send and receive, and put and get instructions, as described, consume two hardware threads or might consume two passive threads.

In some embodiments, the put-get and send-receive can be combined with access bits which designate memory to which the sender is allowed access. Passing along the access bits can enable a reduction in overhead while enabling protection across processes. The overhead of switching or sending a message drops significantly because the receiver already knows the memory to which the sender has access.

Referring to FIGS. 1A, 1B, 1C, and 1D, schematic block diagrams show embodiments of an information handling apparatus 100 adapted to facilitate resource allocation. Libraries or other objects (and associated threads) can request entitlements. Objects use resources to execute. For example, a networking library has greater usage of a network resource than other libraries or objects. Particular entitlements may be assigned to individual library routines using an entitlement vector, which can indicate expected capabilities to which an object may be entitled. Entitlements may be assigned via the entitlement vector. An entitlement vector may be used when selecting a thread for execution in a multi-threading environment in terms of aspects such as priority. In an illustrative embodiment, an information handling apparatus 100 can comprise a library 102 comprising a plurality of functions 150 and components 152 operable to handle a plurality of objects 154. The information handling apparatus 100 can further comprise an entitlement vector 104 operable to assign entitlement 106 to at least one of a plurality of resources 108 to selected ones of the plurality of functions 150 and components 152.

Power is typically global to a process or to an individual CPU. Use of capabilities enables more refined control of power, for example power can be made specific to an object or library routine. With power global to a process, the process will continue to run in absence of a fault, a page fault, a disk access, or the like, and will run until blocked by the operating system scheduler, allowing high power consumption. Use of capabilities enables power to be controlled on a per-hardware thread granularity. Use of capabilities further enables power to be controlled specific to a per-hardware thread granularity for throttling power. Accordingly, the information handling apparatus 100 can be configured wherein the entitlement vector 104 is operable to indicate expected capabilities 144 to which an object 154 is entitled.

Resource allocation can be handled via various architectural aspects of a system including microarchitecture, instruction set architecture (ISA), operating system, and library calls. Software can associate capabilities with particular library functions or software objects. This software can be in the form of compiler, operating system, or others. The operating system can, for example, create a profile for any process running floating point operations and give that entitlement. Resources allocated include processors, central processing units (CPUs), graphics hardware, network controllers, memory, memory management, other hardware, and the like. Resources further include power, cycles, and the like. Thus, in various embodiments of the information handling apparatus 100, the plurality of resources 108 can comprise physical/logical resources 110 and operational resources 112.

The physical/logical resources 110 of a particular information handling apparatus 100 can be one or more of physical and/or logical instances of processors 116, central processing units (CPUs) 117, graphics hardware 118, network controllers 119, memory 120, memory management 121, hardware 122, microarchitecture 123, sound cards 124, video cards 125, network interfaces 126, instruction set architecture (ISA) 127, library calls 128, library functions 129, software objects 130, compilers 131, operating systems 132, and the like.

Resources can be allocated in response to any countable or measurable operating condition or parameter, for example electrons, constraints, frequency, cycles, power, voltage, and the like, to control the thread pool and pool of resources. Two highly useful conditions or parameters for monitoring are power and cycles, which are the basis for other measurable phenomena. Monitoring of operating conditions can be performed in hardware or via software call. Thus, in various embodiments and/or applications of the information handling apparatus 100, the operational resources 112 can be one or more entities or phenomena including, for example, power 133, voltage 134, current 135, electrons 136, frequency 137, execution cycles 138, battery consumption 139, battery life 140, constraints 141, temperature 142, and measurable phenomena 143, and the like.

In some embodiments of the information handling apparatus 100, entitlement 106 can be specified as predetermined rights wherein a process 114 of a plurality of processes 114 is entitled to a predetermined percentage of operational resources 112.

In some implementations, entitlement 106 can be set according to a predetermined algorithm which defines a "fair share" for the processes, for example round-robin, history-based, randomized, and the like, which are efficient since a large history need not be accumulated. Thus, an efficient and inexpensive hardware implementation is possible.

A particular scheme can allocate modulo by bit to avoid starving a process with lower entitlement. Accordingly, in some conditions, the level of entitlement can be overridden or adjusted In particular example embodiments of the information handling apparatus 100, the operational resources 112 can be allocated modulo by bit to avoid starving a process 114 with a lower entitlement value.

The entitlement vector 104 can have various aspects of functionality. For example, the entitlement vector 104 can be operable to request selected resources 108 of the plurality of resources 108.

Similarly, the entitlement vector 104 can be operable as a request to an operating system 132 to allocate resources 108.

In some embodiments of the information handling apparatus 100, the entitlement vector 104 can be operable as a hint instruction applied to hardware 122 which uses the entitlement vector 104 for scheduling.

In another aspect of operation, the entitlement vector 104 can be returned from a library call 128. In a particular implementation, the entitlement vector 104 can be returned from a library call 128 by reference to an address/register location. Similarly, in some embodiments of the information handling apparatus 100, the entitlement vector 104 can be installed as a result of making a library call 128.

Figure 1B:
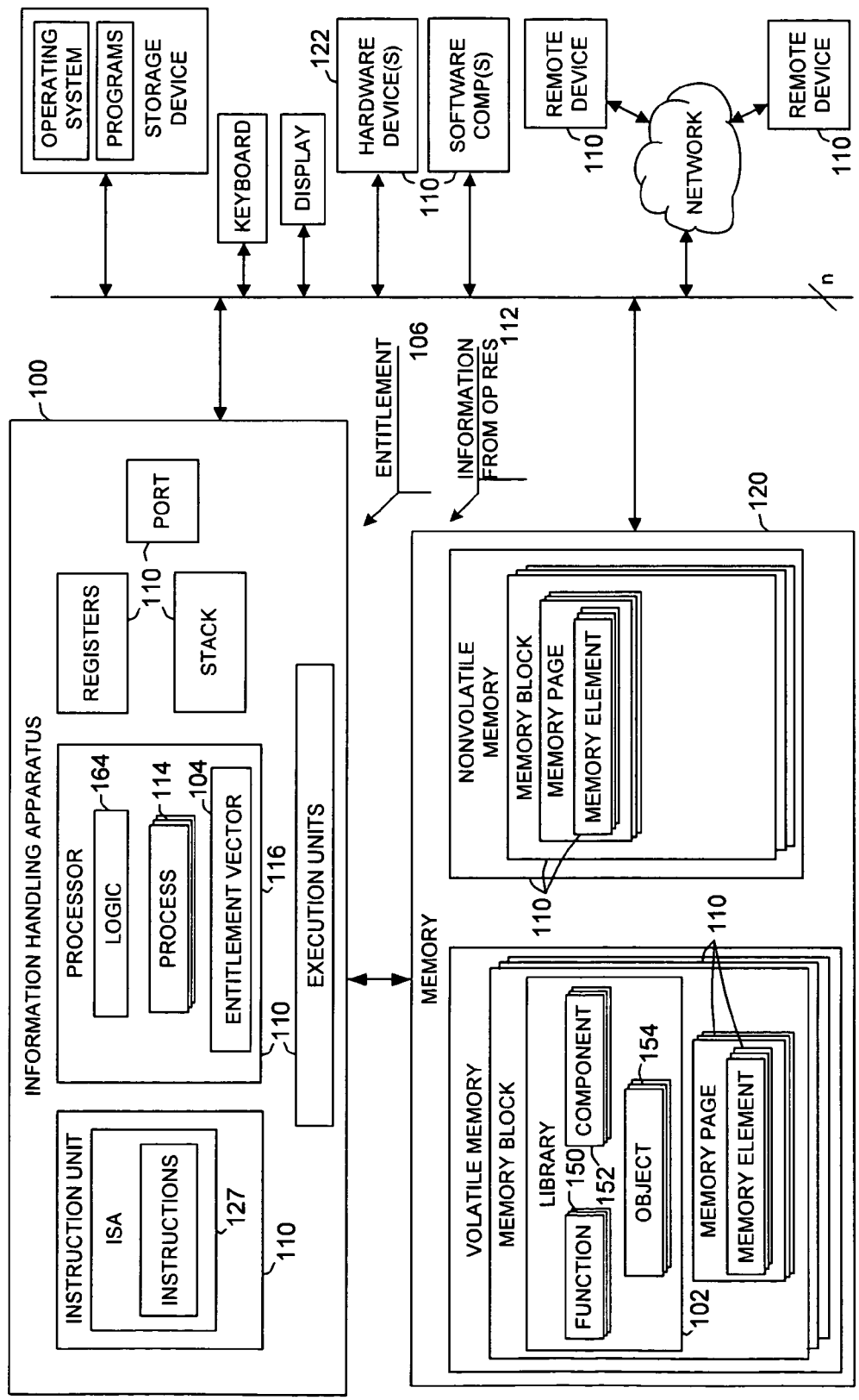

Some embodiments of the information handling apparatus 100, for example as shown in FIG. 1B, can further comprise logic 164 operable to ascertain resources 108 and/or capabilities 144 used by an object 154 of the plurality of objects 154 and further operable to set the entitlement vector 104 according to the ascertained resources 108 and/or capabilities 144.

Similarly, in various embodiments of the information handling apparatus 100, the logic 164 operable to ascertain resources 108 and/or capabilities 144 can be included in the library 102 and operable to request the ascertained resources 108 and/or capabilities 144.

In some embodiments and/or applications, the information handling apparatus 100 can comprise logic 164 operable to ascertain resources 108 and/or capabilities 144 which is included in the library 102 and operable to request preferential scheduling of the ascertained resources 108 and/or capabilities 144.

Also in some implementations of the information handling apparatus 100, the logic 164 operable to ascertain resources 108 and/or capabilities 144 can be included in the library 102 in one or more form selected from a group including a hint, a data structure, and a set of at least one bit.

In some embodiments of the information handling apparatus 100, the logic 164 can be operable to specify resources 108 rather than or in addition to ascertaining resources 108. Accordingly, in another aspect of operation the information handling apparatus 100 can further comprise logic 164 operable to specify resources 108 and/or capabilities 144 used by an object 154 of the plurality of objects 154 and can further be operable to set the entitlement vector 104 according to the specified resources 108 and/or capabilities 144.

In some embodiments, the logic 164 operable to specify resources 108 and/or capabilities 144 can be included in the library 102 and operable to request the specified resources 108 and/or capabilities 144.

In some embodiments and/or applications, the information handling apparatus 100 can comprise logic 164 operable to specify resources 108 and/or capabilities 144 which is included in the library 102 and operable to request preferential scheduling of the specified resources 108 and/or capabilities 144.

Also in some implementations of the information handling apparatus 100, the logic 164 operable to specify resources 108 and/or capabilities 144 can be included in the library 102 in one or more form selected from a group including a hint, a data structure, and a set of at least one bit.

Figure 1C:
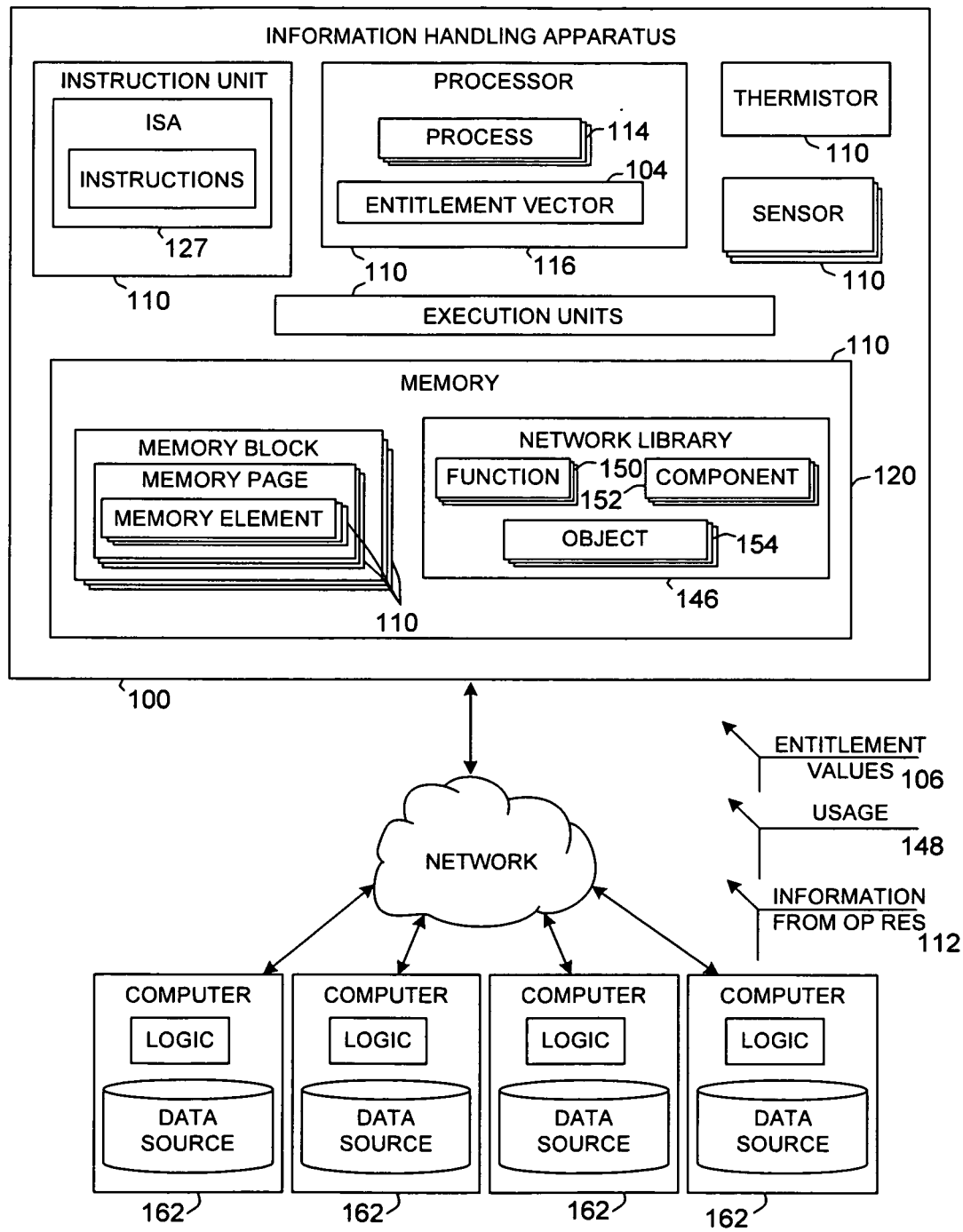

An information handling apparatus 100 can be configured to support prioritized entitlements and resource allocations upon calling selected libraries. A typical embodiment includes such support in software, although hardware support can also be implemented. For example, a network library can include library routines adapted for heavy network usage so that resources giving access to the network are more important processes to schedule. More entitlements are allocated to network-related resources. Libraries can also be configured to handle secondary priorities that change dynamically. For example, a sound card can have a greater power priority and have a pattern of operation wherein a process uses a network card and possibly other subsystems in combination with the sound card. Thus, the network card and other subsystems can also be allocated a higher priority. Similarly, for a process which performs less modeling and number computation in lieu of higher input/output operations and sending of information, a higher level of priority can be allocated to input/output resources. Accordingly, for example as shown in FIG. 1C, embodiments of the information handling apparatus 100 can be configured to address the increased requirements for networking resources of a network library 146. The library 102 can be a network library 146 comprising at least one of a plurality of library calls 128, library functions 129, software objects 130, compilers 131, and operating systems 132.

In some embodiments of the information handling apparatus 100, the network library 146 can comprise a plurality of library functions 129 adapted for allocation of increased priority for network access resources 162. The entitlement vector 104 can be operable to allocate an increased entitlement 106 to the network access resources 162.

The illustrative information handling apparatus 100 can further comprise logic 164 operable to determine usage 148 of at least one of operational resources 112 for a network library 146 comprising at least one of a plurality of library calls 128, library functions 129, software objects 130, compilers 131, and operating systems 132. The logic 164 can be further operable to allocate priority of entitlement 106 according to the usage 148.

Figure 1D:
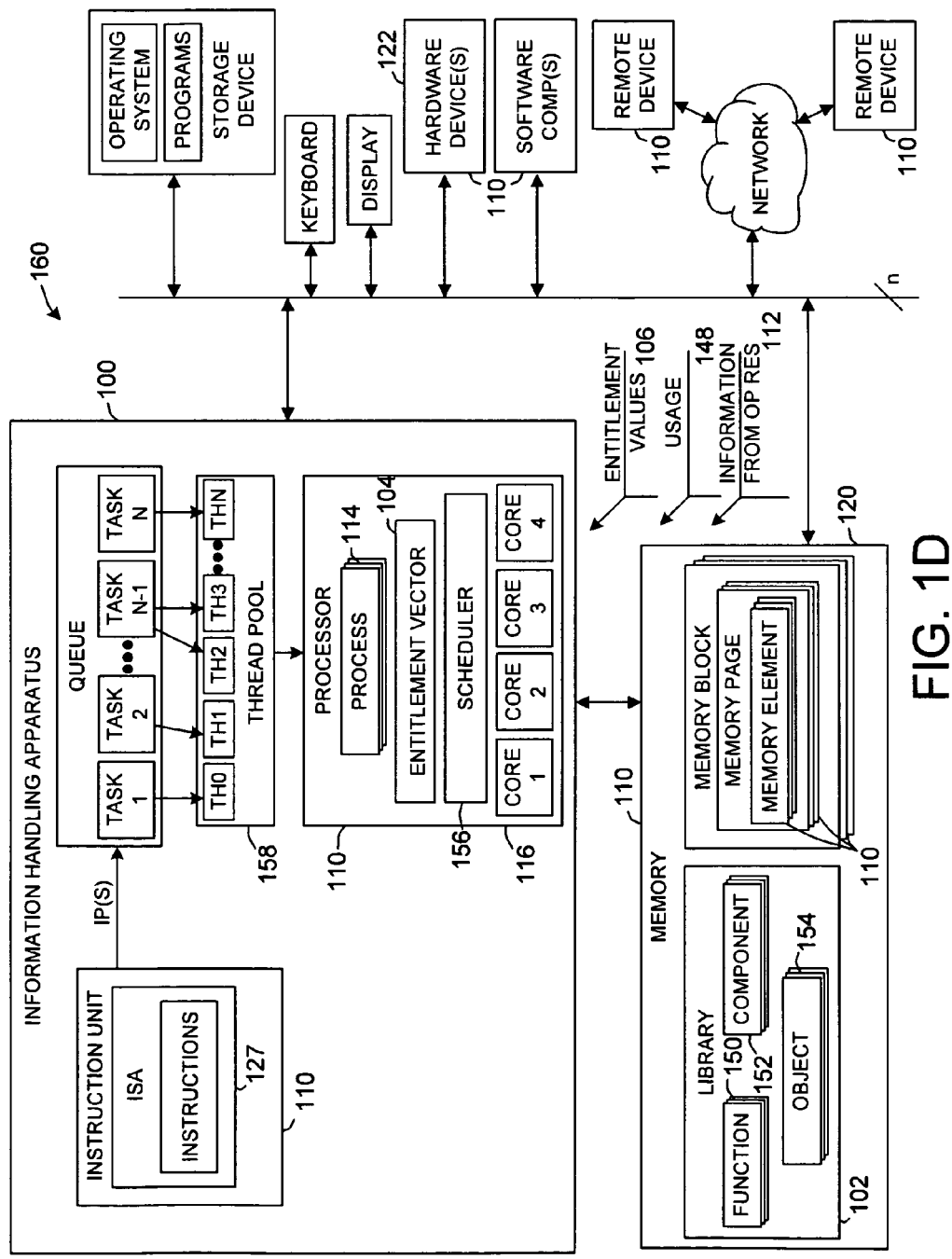

Referring to FIG. 1D, a scheduler or chooser can monitor entitlement values and schedule the next highest priority process. A particular scheme can allocate modulo by bit to avoid starving a process with lower entitlement. In some conditions, the level of entitlement can be overridden or adjusted. Entitlement can be set according to a predetermined algorithm which defines a "fair share" for the processes, for example round-robin, history-based, randomized, and the like, which are efficient since a large history need not be accumulated. Thus, an efficient and inexpensive hardware implementation is possible. Accordingly, some embodiments of the information handling apparatus 100 can further comprise a scheduler 156 operable to schedule a process 114 of a plurality of processes 114 based on the entitlement 106.

A field of the entitlement vector can be a chooser/thread selector. The entitlement vector can be used by the chooser/scheduler, which includes logic that performs operations based on a single entitlement vector or possibly relative entitlement vectors. Each Instruction Pointer (IP) or thread can have an associated entitlement vector. For example instruction pointers, for IP1, IP2, IP3, IP4, then four entitlement vectors can be allocated. Chooser/scheduler logic considers the entitlement vector when scheduling the next thread for computation. The logic informs the chooser/scheduler about how to make the selection. The logic can perform selected functions to make the choice and for scheduling, for example by elevating or decreasing priority of a thread. Thus, embodiments of the information handling apparatus 100 can be configured as a multi-threaded system and can further comprise a scheduler 156 operable to schedule a thread 158 of a plurality of threads 158 in a multi-threaded environment 160 based on the entitlement 106.

A performance capabilities framework can be defined to address handling of a pool of available resources. A thread pool pattern can be configured wherein a number of threads are created to perform a number of tasks which are typically organized in a queue. Usually, the number of tasks is greater than the number of threads. A thread upon completing an associated task will request the next task from the queue until all tasks have completed. The thread can then terminate or become inactive until new tasks are available. The number of threads can be tuned to improve performance, and can be dynamically updated based on the number of waiting tasks. Increasing the size of the thread pool can result in higher resource usage.

A limit on computation can be imposed according to setting of priority level which is, in turn, based on available resources. One example resource that can be monitored to set limits on computation is the battery. Limits on computation can be imposed based on battery consumption, battery life remaining. Computational limits can be addressed via a framework of setting capabilities, for example specifying a capability to execute on selected processing resources. In an example implementation, the capability can be set up in metadata.

A sensor or sensors can detect whether battery bias voltage level is recovering too slowly or, similarly, a thermistor can indicate a battery is too hot which may indicate operating at too aggressive a level. A bit or bits can be set indicating the recovery time is too long. The set bit(s) can be used to throttle the maximum thread hopping rate in the case of a CPU with two threads. The bits disallow a thread hop and set an allowable rate of thread hopping; or perhaps allow thread hopping which creates slowing but saves power.

Figure 2:
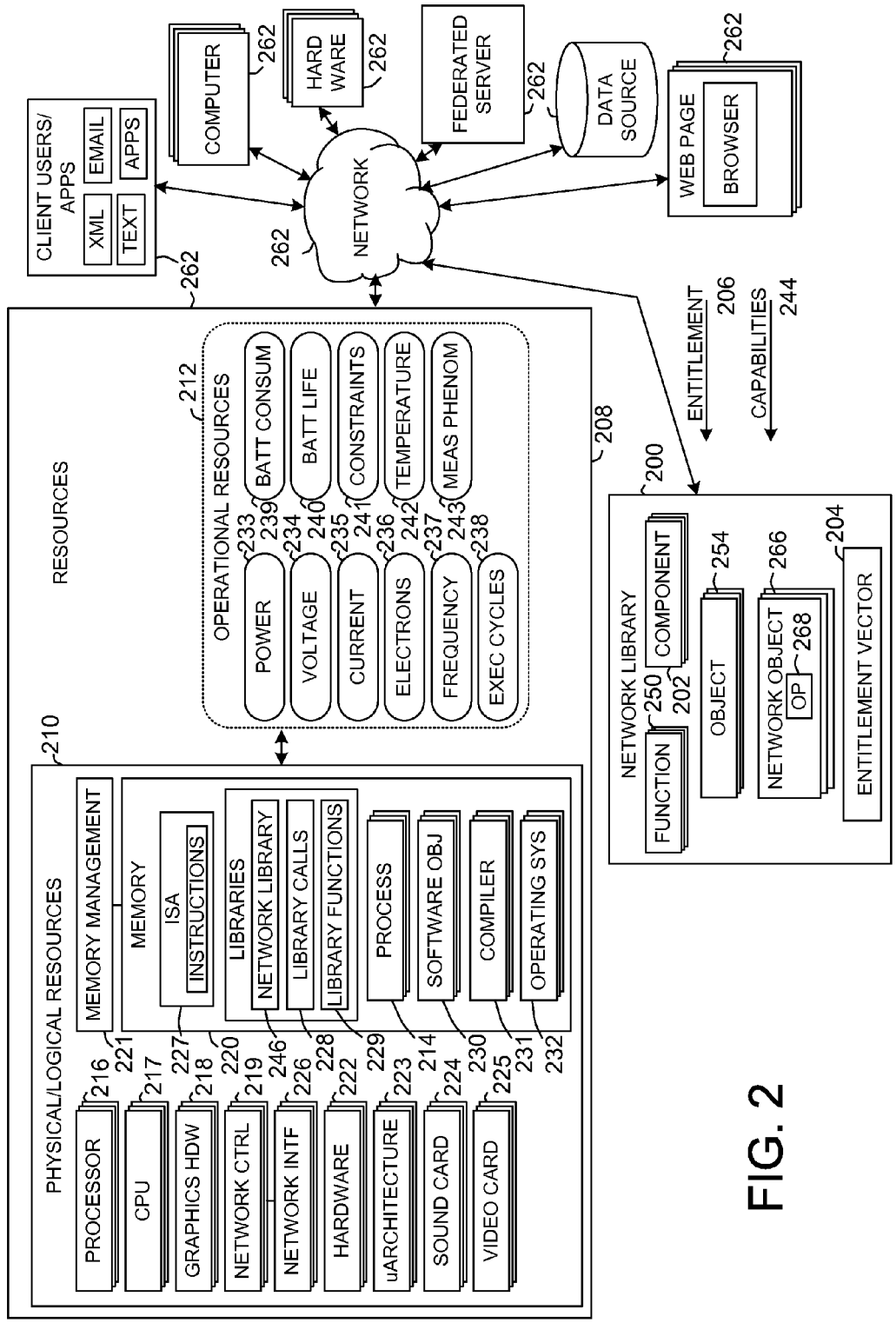
FIG. 2 is a schematic block diagram depicting an embodiment of a network library which includes library routines adapted for heavy network usage so that resources giving access to the network are more important processes to schedule.

Referring to FIG. 2, a schematic block diagram depicts an embodiment of a network library 200 which includes library routines adapted for heavy network usage so that resources giving access to the network are more important processes to schedule. The illustrative network library 200 can comprise a plurality of functions 250 operable to process and manipulate a plurality of network objects 266 stored in a selected storage format; and a plurality of library components 202 operable to assign entitlement 206 to selected resources 208 using an entitlement vector 204 operable to indicate capabilities 244 to which ones of the plurality of network objects 266 are entitled.

A library is a collection of resources used to develop software, including pre-written code and subroutines, classes, values, or type specifications. Libraries contain code and data to enable services to independent programs, encouraging code sharing, modification, and distribution. Executables can be both standalone programs and libraries, although many libraries are not executable. Executables and libraries make references known as links to each other through the process known as linking, for example by using a linker.

In some embodiments of the network library 200, ones of the plurality of library components 202 can be operable to invoke selected resource allocation operations of the plurality of network objects 266. Similarly, in various aspects and configurations of the network library 200, one or more of the plurality of library components 202 can be operable to access and use the network library 200 to create, process, apply, modify, manipulate, maintain, access, and store selected ones of the plurality of network objects 266.

For example, higher entitlement 206 can be allocated to network-related resources. Libraries can also be configured to handle secondary priorities that change dynamically. For example, a sound card can have a greater power priority and have a pattern of operation wherein a process uses a network card and possibly other subsystems in combination with the sound card. Thus, the network card and other subsystems can also be allocated a higher priority. Similarly, for a process which performs less modeling and number computation in lieu of higher input/output operations and sending of information, a higher level of priority can be allocated to input/output resources.

In various embodiments and/or applications of the network library 200, one or more of the plurality of library components 202 can be operable to invoke selected resource allocation operations 268 of the plurality of network objects 266.

The network library 200 can be configured to facilitate resource allocation in architectural aspects of a system including microarchitecture, instruction set architecture (ISA), operating system, and library calls. Capabilities can be associated with particular library functions or software objects using various software components such as compilers, operating systems, or the like. The operating system can, for example, create a profile for any process running floating point operations and give that entitlement. Resources allocated include processors, central processing units (CPUs), graphics hardware, network controllers, memory, memory management, other hardware, and the like. Resources further include power, cycles, and the like. Thus, in various embodiments of the network library 200, the plurality of resources 208 can comprise physical/logical resources 210 and operational resources 212.

The physical/logical resources 210 of a particular network library 200 can be one or more of physical and/or logical instances of processors 216, central processing units (CPUs) 217, graphics hardware 218, network controllers 219, memory 220, memory management 221, hardware 222, microarchitecture 223, sound cards 224, video cards 225, network interfaces 226, instruction set architecture (ISA) 227, library calls 228, library functions 229, software objects 230, compilers 231, operating systems 232, and the like.

Resources can be allocated in response to any countable or measurable operating condition or parameter, for example electrons, constraints, frequency, cycles, power, voltage, and the like, to control the thread pool and pool of resources. Two highly useful conditions or parameters for monitoring are power and cycles, which are the basis for other measurable phenomena. Monitoring of operating conditions can be performed in hardware or via software call. Thus, in various embodiments and/or applications of the network library 200, the operational resources 212 can be one or more entities or phenomena including, for example, power 233, voltage 234, current 235, electrons 236, frequency 237, execution cycles 238, battery consumption 239, battery life 240, constraints 241, temperature 242, and measurable phenomena 243, and the like.

In some embodiments of the network library 200, entitlement 206 can be specified as predetermined rights wherein a process 214 of a plurality of processes 214 is entitled to a predetermined percentage of operational resources 212.

The network library 200 can comprise at least one of a plurality of library calls 228, library functions 229, software objects 230, compilers 231, and operating systems 232.

Some embodiments of the network library 200 can comprise a plurality of library functions 229 adapted for allocation of increased priority for network access resources 262. The entitlement vector 204 can be operable to allocate an increased entitlement 206 to the network access resources 262.

In various embodiments of the network library 200, the entitlement vector 204 can have various aspects of functionality. For example, the entitlement vector 204 is set according to specified resources 208 and/or capabilities 244 used by an object 254 of the plurality of objects 254.

Similarly, the entitlement vector 204 can be operable to request selected resources 208 of the plurality of resources 208.

In other examples, the entitlement vector 204 can be operable as a request to an operating system 232 to allocate resources 208.

In some embodiments of the network library 200, the entitlement vector 204 can be operable as a hint instruction applied to hardware 222 which uses the entitlement vector 204 for scheduling.

In another aspect of operation, the entitlement vector 204 can be returned from a library call 228. In a particular implementation, the entitlement vector 204 can be returned from a library call 228 by reference to an address/register location. Similarly, in some embodiments of the network library 200, the entitlement vector 204 can be installed as a result of making a library call 228.

Figure 3C:
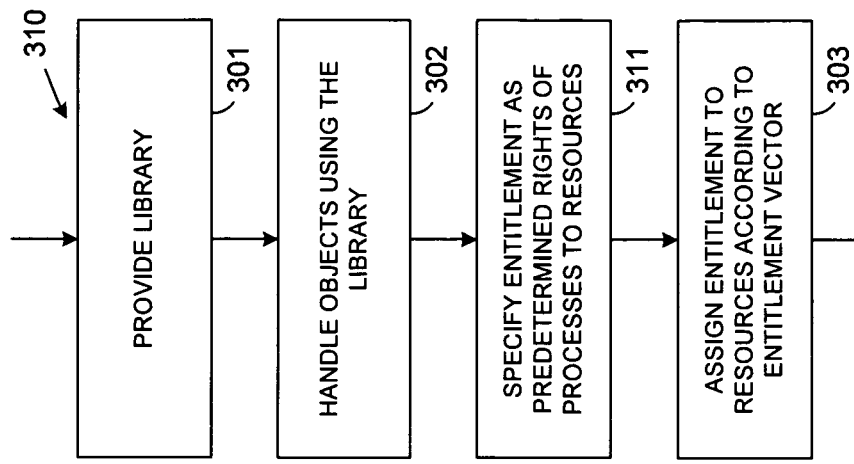
FIGS. 3A through 3V are schematic flow diagrams illustrating an embodiment or embodiments of a method operable in an information handling apparatus adapted for allocating resources.
Figure 3B:
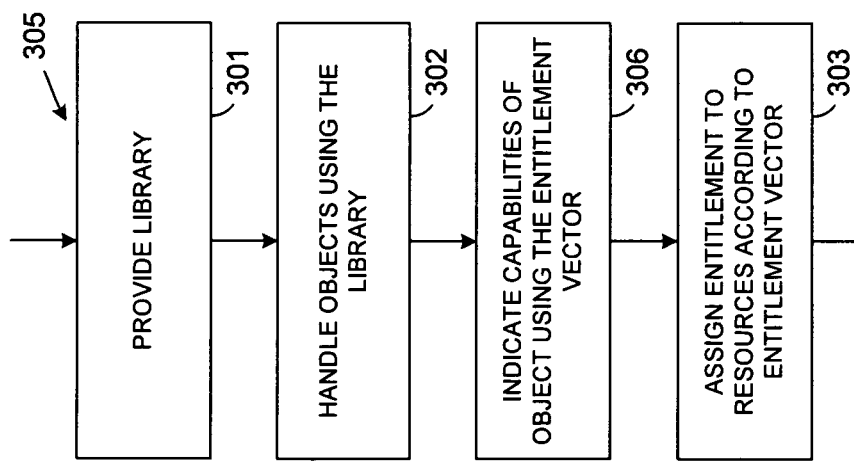
Figure 3A:
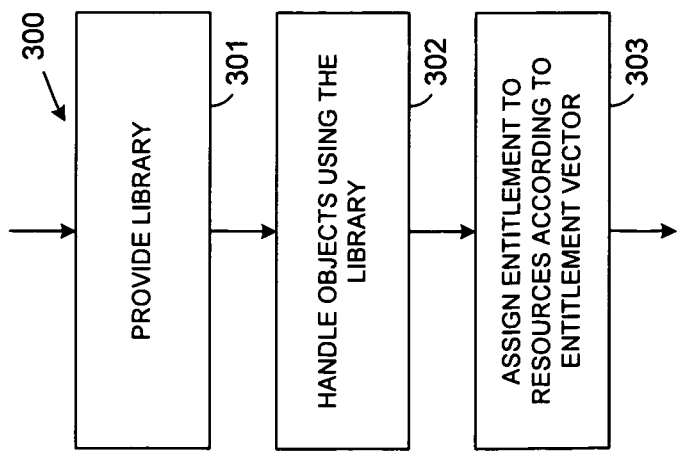

Referring to FIGS. 3A through 3V, schematic flow diagrams depict an embodiment or embodiments of a method operable in an information handling apparatus adapted for allocating resources. Referring to FIG. 3A, a method 300 operable in an information handling apparatus can comprise providing 301 a library comprising a plurality of functions and components, and handling 302 a plurality of objects using the library. The method 300 can further comprise assigning 303 entitlement to at least one of a plurality of resources to selected ones of the plurality of functions and components using an entitlement vector.

The resources can include physical/logical resources and operational resources. In various embodiments of the method 300, the physical/logical resources are can be one or more of various physical and/or logical instances of processors, central processing units (CPUs), graphics hardware, network controllers, memory, memory management, hardware, microarchitecture, sound cards, video cards, network interfaces, instruction set architecture (ISA), library calls, library functions, software objects, compilers, operating systems, and the like.

Similarly, embodiments of the method 300 can operate upon one or more operational resources selected from among power, voltage, current, electrons, frequency, execution cycles, battery consumption, battery life, constraints, temperature, measurable phenomena, and the like.

Referring to FIG. 3B, example embodiments of a method 305 for allocating resources in an information handling apparatus can further comprise indicating 306 expected capabilities to which an object is entitled using the entitlement vector.

In some embodiments and applications, as illustrated in FIG. 3C, a method 310 operable in an information handling apparatus can further comprise specifying 311 the entitlement as predetermined rights wherein a process of a plurality of processes is entitled to a predetermined percentage of operational resources.

Figure 3F:
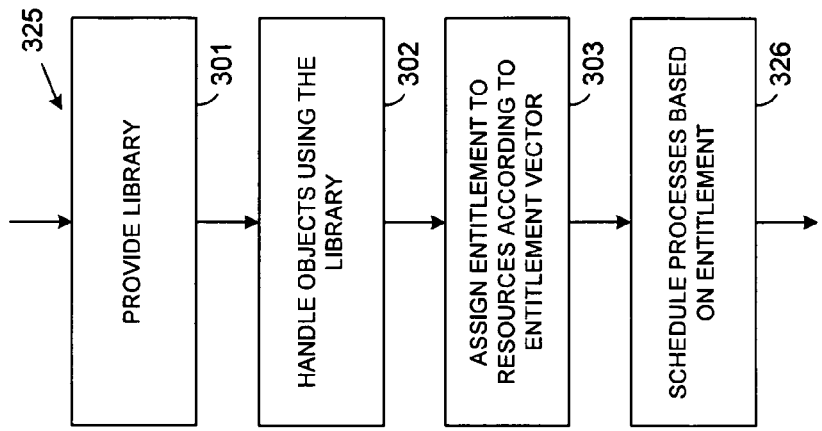
Figure 3E:
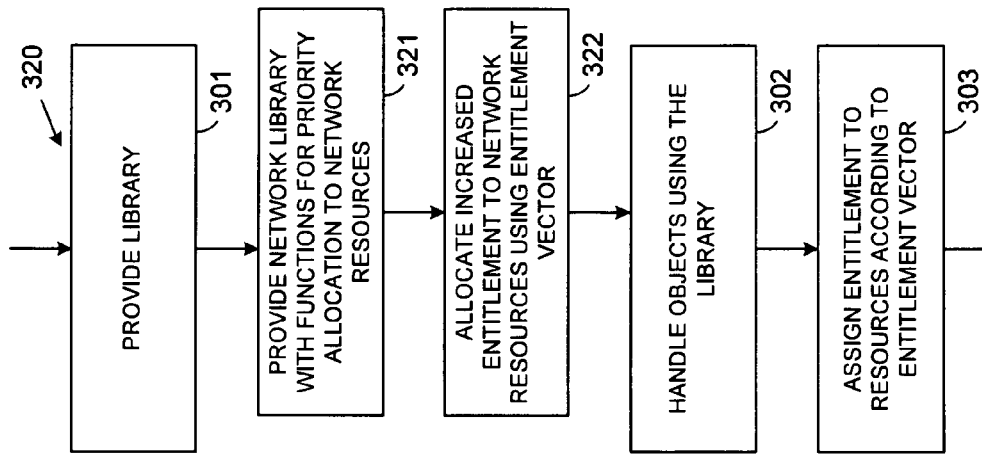
Figure 3D:
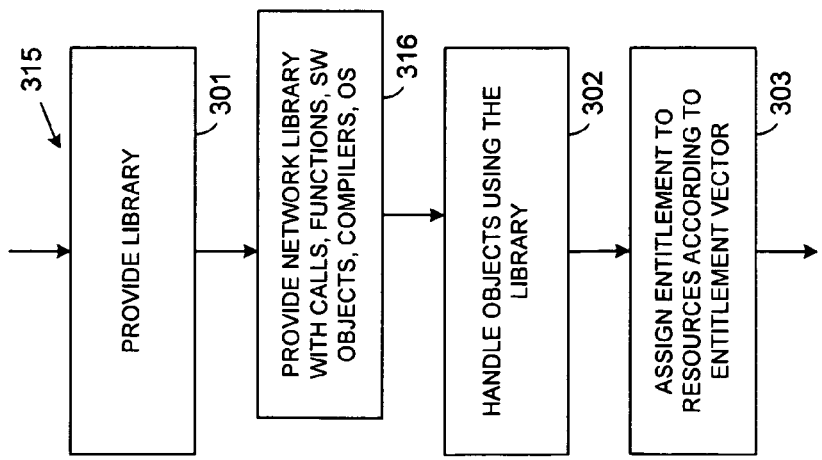

As shown in FIG. 3D, a method 315 operable in an information handling apparatus can comprise providing 301 the library wherein providing 316 a network library comprising at least one of a plurality of library calls, library functions, software objects, compilers, and operating systems.

Referring to FIG. 3E, a method 320 operable in an information handling apparatus can further comprise providing 321 a network library comprising a plurality of library functions adapted for allocation of increased priority for network access resources, and allocating 322 an increased entitlement to the network access resources using the entitlement vector.

A method 325 operable in an information handling apparatus, for example as shown in FIG. 3F, can further comprise scheduling 326 a process of a plurality of processes based on the entitlement.

Similarly, as depicted in FIG. 3G, in some embodiments a method 330 operable in an information handling apparatus can comprise scheduling 331 a thread of a plurality of threads in a multi-threaded environment based on the entitlement.

Referring to FIG. 3H, a method 335 operable in an information handling apparatus can comprise ascertaining 336 resources and/or capabilities used by an object of the plurality of objects, and setting 337 the entitlement vector according to the ascertained resources and/or capabilities.

In further embodiments, as illustrated in FIG. 3I, a method 340 operable in an information handling apparatus can comprise ascertaining 341 resources and/or capabilities using the library; and requesting 342 the ascertained resources and/or capabilities.

Figure 3L:
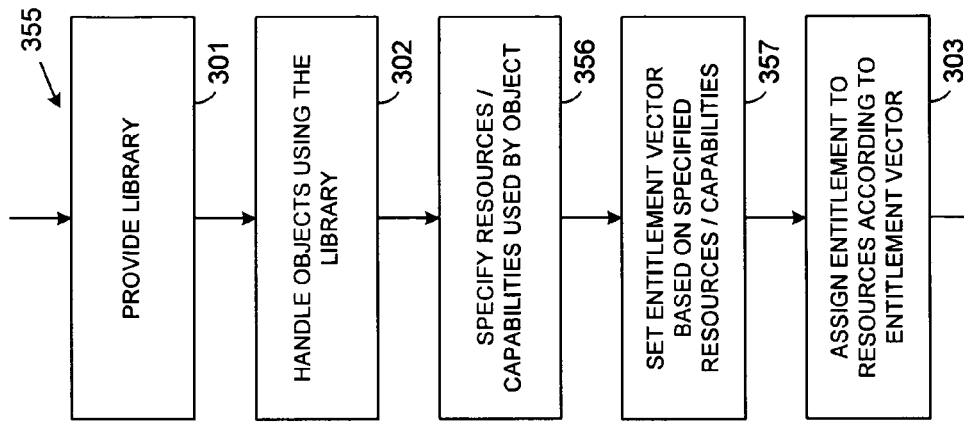
Figure 3K:
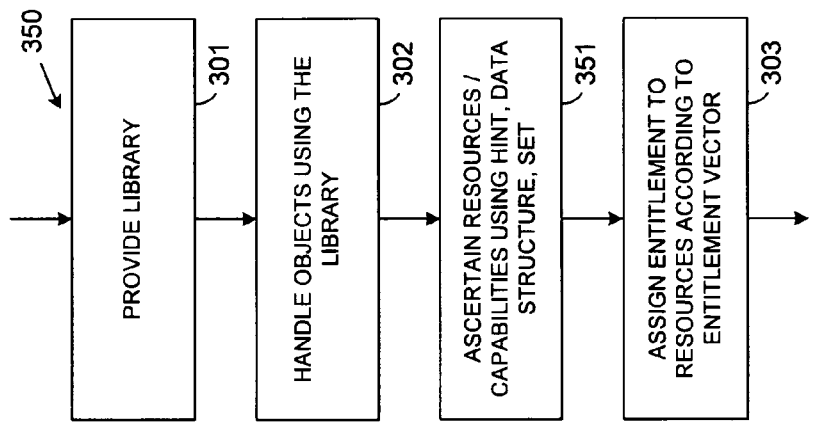
Figure 3J:
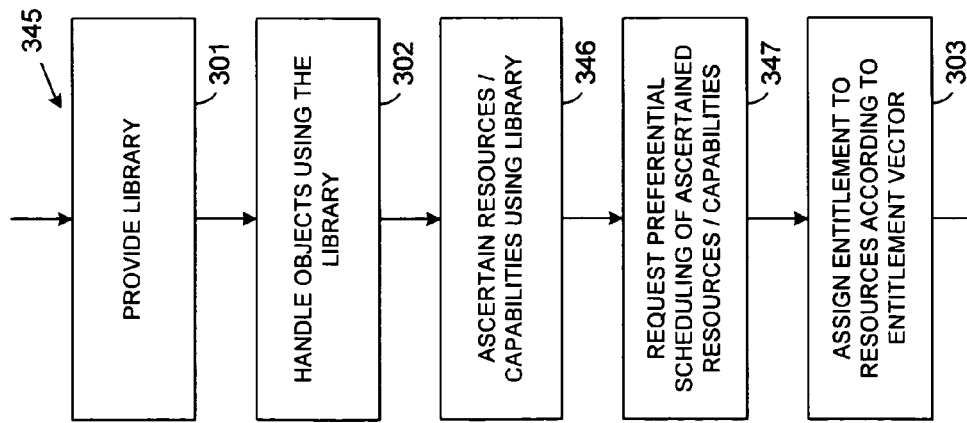

Similarly, as depicted in FIG. 3J, in some embodiments a method 345 operable in an information handling apparatus can comprise ascertaining 346 resources and/or capabilities using the library, and requesting 347 preferential scheduling of the ascertained resources and/or capabilities.

A method 350 operable in an information handling apparatus, for example as shown in FIG. 3K, can further comprise ascertaining 351 resources and/or capabilities using the library in one or more form selected from a group consisting of a hint, a data structure, and a set of at least one bit.

Referring to FIG. 3L, a method 355 operable in an information handling apparatus can further comprise specifying 356 resources and/or capabilities used by an object of the plurality of objects, and setting 357 the entitlement vector according to the specified resources and/or capabilities.

As shown in FIG. 3M, a method 360 operable in an information handling apparatus can further comprise specifying 361 resources and/or capabilities using the library, and requesting 362 the specified resources and/or capabilities.

In further embodiments, as illustrated in FIG. 3N, a method 365 operable in an information handling apparatus can comprise specifying 366 resources and/or capabilities using the library, and requesting 367 preferential scheduling of the specified resources and/or capabilities.

Similarly, as depicted in FIG. 3O, in some embodiments a method 370 operable in an information handling apparatus can further comprise specifying 371 resources and/or capabilities using the library in one or more form selected from a group consisting of a hint, a data structure, and a set of at least one bit.

Figure 3R:
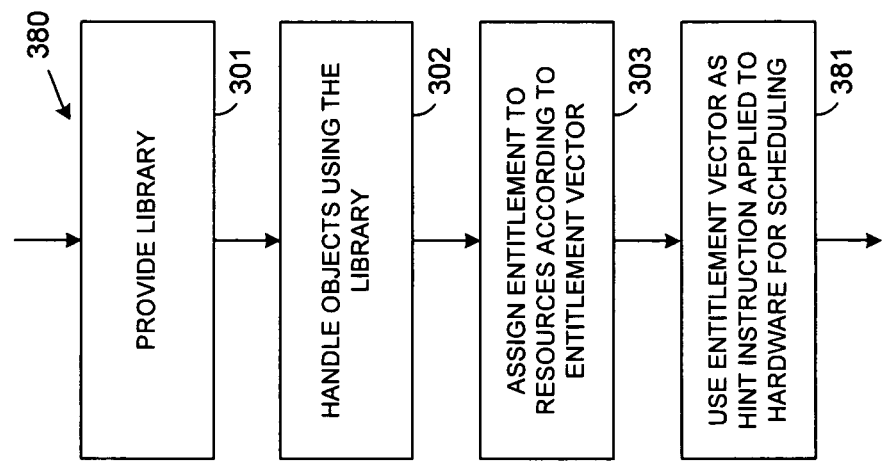
Figure 3Q:
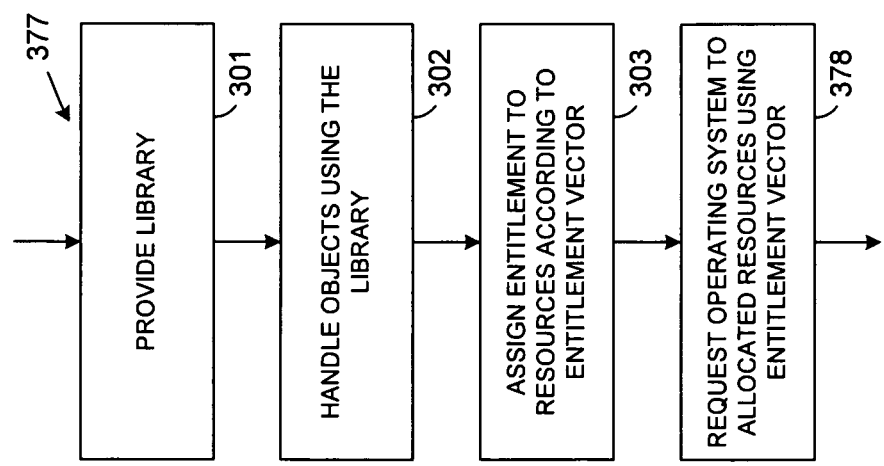
Figure 3P:
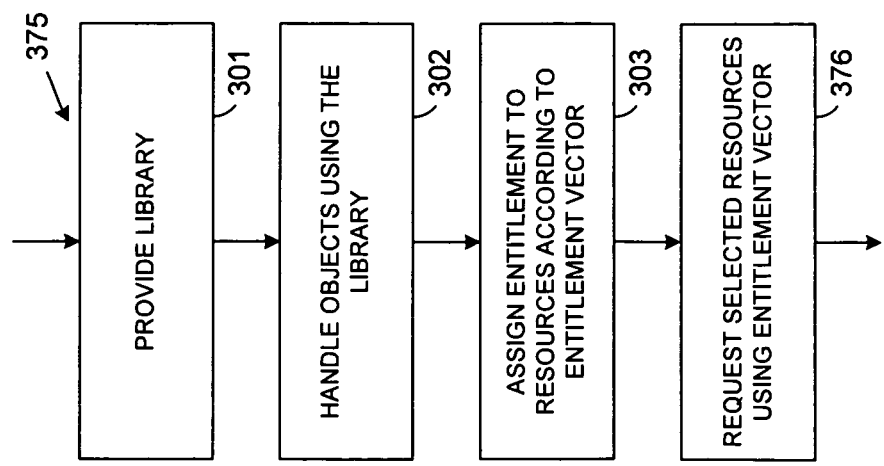

A method 375 operable in an information handling apparatus, for example as shown in FIG. 3P, can further comprise requesting 376 selected resources of plurality of resources using the entitlement vector.

Referring to FIG. 3Q, a method 377 operable in an information handling apparatus can further comprise requesting 378 an operating system to allocate resources using the entitlement vector.

As shown in FIG. 3R, a method 380 operable in an information handling apparatus can further comprise using 381 the entitlement vector as a hint instruction applied to hardware which uses the entitlement vector for scheduling.

In further embodiments, as illustrated in FIG. 3S, a method 382 operable in an information handling apparatus can comprise returning 383 the entitlement vector from a library call.

Similarly, as depicted in FIG. 3T, in some embodiments a method 385 operable in an information handling apparatus can further comprise returning 386 the entitlement vector from a library call by reference to an address/register location.

A method 387 operable in an information handling apparatus, for example as shown in FIG. 3U, can further comprise installing 388 the entitlement vector as a result of making a library call.

Referring to FIG. 3V, a method 390 operable in an information handling apparatus can further comprise determining 391 usage of at least one of operational resources for a network library comprising at least one of a plurality of library calls, library functions, software objects, compilers, and operating systems. The method 390 can further comprise allocating 392 priority of entitlement according to the usage.

Figure 4:
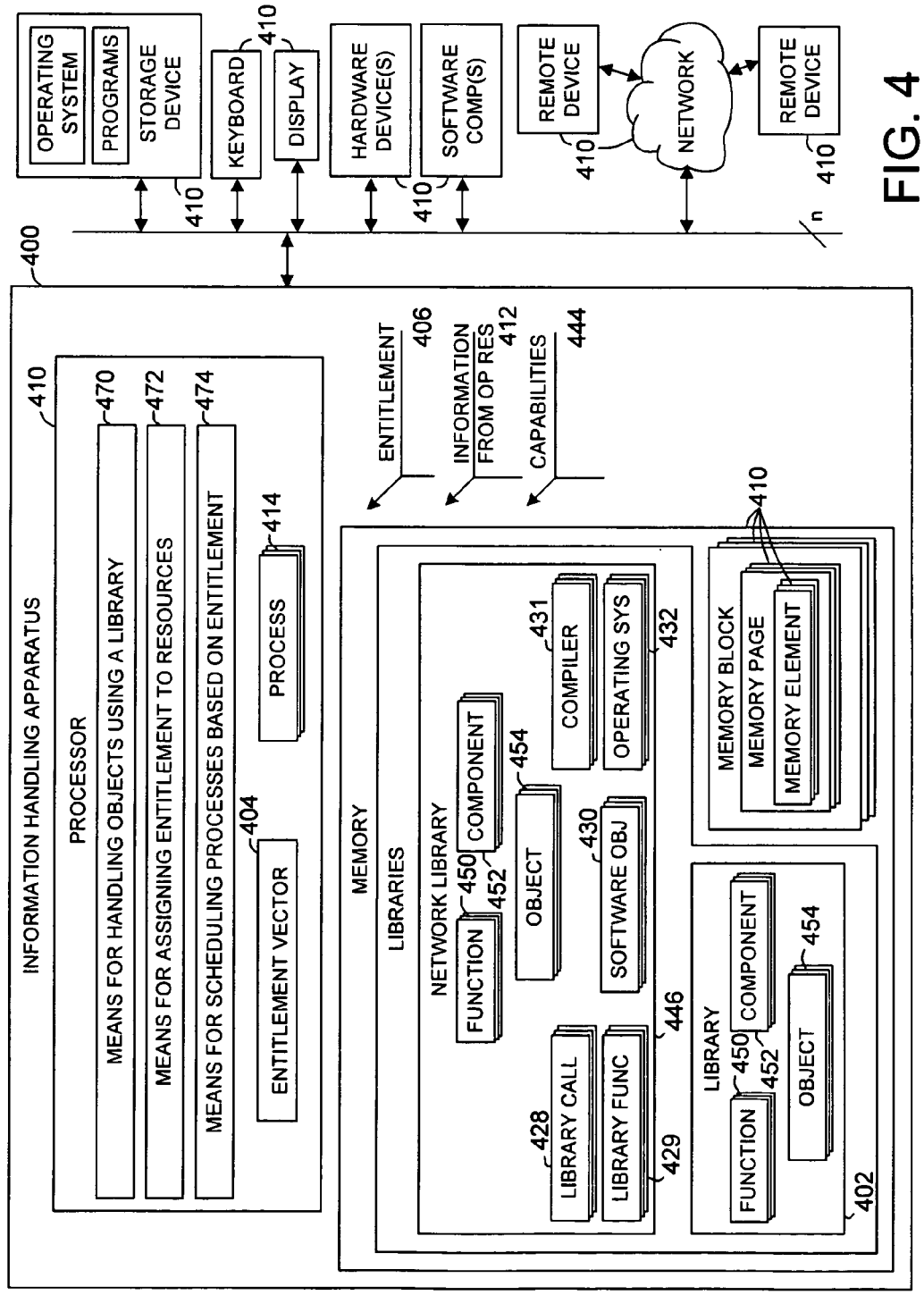
FIG. 4 is a schematic block diagram illustrating an embodiment of a information handling apparatus which adapted to facilitate resource allocation.

Referring to FIG. 4, a schematic block diagram illustrates an embodiment of a information handling apparatus 400 which adapted to facilitate resource allocation. The illustrative information handling apparatus 400 can comprise a library 402 comprising a plurality of functions 450 and components 452. The information handling apparatus 400 can further comprise means 470 for handling a plurality of objects 454 using the library 402, and means 472 for assigning entitlement 406 to at least one of a plurality of resources 408 to selected ones of the plurality of functions 450 and components 452 using an entitlement vector 404.

In various embodiments of the information handling apparatus 400, the entitlement vector 404 can be operable to indicate expected capabilities 444 to which an object 454 is entitled. The plurality of resources 408 can comprise physical/logical resources 410 and operational resources 412. The library 402 can comprise a network library 446 comprising at least one of a plurality of library calls 428, library functions 429, software objects 430, compilers 431, operating systems 432, and the like.

The information handling apparatus 400 can further comprise means 474 for scheduling a process 414 of a plurality of processes 414 based on the entitlement 406.

Terms "substantially", "essentially", or "approximately", that may be used herein, relate to an industry-accepted variability to the corresponding term. Such an industry-accepted variability ranges from less than one percent to twenty percent and corresponds to, but is not limited to, materials, shapes, sizes, functionality, values, process variations, and the like. The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

The illustrative pictorial diagrams depict structures and process actions in a manufacturing process. Although the particular examples illustrate specific structures and process acts, many alternative implementations are possible and commonly made by simple design choice. Manufacturing actions may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, shapes, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

The invention claimed is:

1. An information handling apparatus comprising:
    one or more processors, wherein at least one processor of the one or more processors includes at least:
        one or more libraries including one or more library routines associated with one or more functions or components configured to handle a plurality of objects; and
        one or more entitlement vectors including at least one field specifying one or more of physical/logical resources or operational resources, and specifying entitlement assigned to the one or more of physical/logical resources or operational resources accessed by at least one of the plurality of objects during execution of at least one of the one or more library routines, wherein:
    the one or more entitlement vectors are specified as one or more user-predetermined rights wherein an object of the plurality of objects is entitled to at least a predetermined percentage of at least one of the at least one or more physical/logical resources or operational resources; and
    at least one of the one or more library routines is configured to compare entitlement specified in at least one of the one or more entitlement vectors with respect to usage for the plurality of objects and schedule the plurality of objects from a highest priority to a lowest priority based on the comparison.

2. The information handling apparatus according to claim 1 wherein:
    the one or more entitlement vectors include at least one field configured to indicate expected capabilities to which at least one of the plurality of objects is entitled.

3. The information handling apparatus according to claim 1 wherein the physical/logical resources include at least one of physical or logical instances of:
    processors, central processing units (CPUs), virtual machines, graphics hardware, network controllers, memory, memory management, hardware, microarchitecture, sound cards, video cards, network interfaces, instruction set architecture (ISA), library calls, library functions, software objects, compilers, or operating systems.

4. The information handling apparatus according to claim 1 wherein the operational resources include at least one of:
    power, voltage, current, electrons, frequency, execution cycles, battery consumption, battery life, constraints, temperature, or measurable phenomena.

5. The information handling apparatus according to claim 1 wherein:
    the one or more libraries includes at least one network library including at least one of the one or more library routines including at least one of library calls, library functions, software objects, compilers, or operating systems.

6. The information handling apparatus according to claim 1 further comprising:
    one or more schedulers configured to schedule at least one of one or more processes based at least partially on the entitlement.

7. The information handling apparatus according to claim 1 further comprising:
    one or more schedulers configured to schedule at least one of two or more threads in a multi-threaded environment based on the entitlement.

8. The information handling apparatus according to claim 1 further comprising:
    the one or more libraries includes at least one network library including at least one of the one or more library routines including at least one library function configured for allocation of increased priority for network access resources; and
    the one or more entitlement vectors include at least one field configured to allocate an increased entitlement to the network access resources.

9. The information handling apparatus according to claim 1 further comprising:
    logic configured to ascertain at least one of resources or capabilities accessed by at least one of the plurality of objects and further configured to set at least one of the one or more entitlement vectors based at least partially on the ascertained at least one of the accessed resources or capabilities.

10. The information handling apparatus according to claim 9 wherein:
    the logic configured to ascertain at least one of resources or capabilities accessed by at least one of the plurality of objects is included in at least one of the one or more libraries and is configured to request the ascertained at least one of the accessed resources or capabilities.

11. The information handling apparatus according to claim 9 wherein:
    the logic configured to ascertain at least one of resources or capabilities accessed by at least one of the plurality of objects is included in at least one of the one or more libraries and is configured to request preferential scheduling of the ascertained at least one of the accessed resources or capabilities.

12. The information handling apparatus according to claim 9 wherein:
    the logic configured to ascertain at least one of resources or capabilities accessed by at least one of the plurality of objects is included in at least one of the one or more libraries as a function or component selected from at least one of a hint, a data structure, or a set of at least one bit.

13. The information handling apparatus according to claim 1 further comprising:
  logic configured to specify at least one of resources or capabilities accessed by at least one of the plurality of objects and is further configured to set at least one of the one or more entitlement vectors based at least partially on the at least one of the specified resources or capabilities.

14. The information handling apparatus according to claim 13 wherein:
  the logic configured to specify at least one of resources or capabilities accessed by at least one of the plurality of objects is included in at least one of the one or more libraries and is configured to request the at least one of the specified resources or capabilities.

15. The information handling apparatus according to claim 13 wherein:
  the logic configured to specify at least one of resources or capabilities accessed by at least one of the plurality of objects is included in at least one of the one or more libraries and is configured to request preferential scheduling of the at least one of the specified resources or capabilities.

16. The information handling apparatus according to claim 13 wherein:
  the logic configured to specify at least one of resources or capabilities accessed by at least one of the plurality of objects is included in at least one of the one or more libraries as at least one of a function or a component selected from a hint, a data structure, or a set of at least one bit.

17. The information handling apparatus according to claim 1 wherein:
  the one or more entitlement vectors include at least one field configured to request at least one of the one or more of physical/logical resources or operational resources.

18. The information handling apparatus according to claim 1 wherein:
  the one or more entitlement vectors include at least one field configured as a request to an operating system to allocate at least one of the one or more of physical/logical resources or operational resources.

19. The information handling apparatus according to claim 1 wherein:
  the one or more entitlement vectors include at least one field configured as a hint instruction applied to hardware which uses the one or more entitlement vectors for scheduling.

20. The information handling apparatus according to claim 1 wherein:
  the one or more entitlement vectors is returned from a library call.

21. The information handling apparatus according to claim 1 wherein:
  the one or more entitlement vectors is returned from a library call by reference to an address/register location.

22. The information handling apparatus according to claim 1, further comprising:
  logic configured to determine usage of at least one of the operational resources for at least one networking library including at least one of the one or more library routines including at least one of library calls, library functions, software objects, compilers, or operating systems; and further configured to allocate priority of entitlement according to the usage.

23. The information handling apparatus according to claim 1 further comprising:
  resource allocation logic including at least one of:
    resource allocation logic configured to dynamically set one or more entitlement values for one or more resources including at least one physical/logical resource and at least one operational resource, wherein the resource allocation logic is configured to associate an instruction pointer (IP) of a plurality of instruction pointers (IPs) with a thread of a plurality of threads and to determine usage of a selected one or more of a plurality of operational resources for a selected one or more of a plurality of physical/logical resources for the associated thread, and configured to allocate the one or more entitlement values specific to the usage of the selected one or more of the plurality of operational resources for the associated thread;
    resource allocation logic configured to dynamically set one or more entitlement values for one or more resources of a plurality of resources including at least one physical/logical resource and at least one operational resource wherein the at least one operational resource corresponds to a countable or measurable operating condition or parameter relating to one or more of the at least one physical/logical resource and the one or more entitlement values are specified as one or more user-predetermined rights wherein a process is allocated a predetermined percentage of the at least one operational resource wherein the resource allocation logic is configured to compare at least one of the one or more entitlement values based at least in part on the usage for a plurality of threads; or
    resource allocation logic configured to associate an instruction pointer (IP) of a plurality of instruction pointers (IPs) with a thread of a plurality of threads and determine usage of a selected one or more of a plurality of operational resources specified as countable or measurable operating conditions or parameters for a selected one or more of a plurality of physical/logical resources for the associated thread, and configured to allocate one or more entitlement values specified as one or more user-predetermined rights to one or more of the plurality of operational resources for the selected one or more of the plurality of physical/logical resources for the associated thread wherein the resource allocation logic is configured to compare at least one of the one or more entitlement values based at least in part on at least one usage or at least one thread of the plurality of threads.

24. The information handling apparatus according to claim 1 wherein:
  the one or more processors are configured to initiate one or more library calls that install into hardware in the one or more processors at least one of the one or more entitlement vectors.

25. The information handling apparatus according to claim 1 wherein:
  at least one of the one or more library routines is configured to organize the plurality of objects to perform a plurality of tasks in a queue and upon completion of a task to request a next task from the queue until all tasks have completed and at least one of the plurality of objects terminates or becomes inactive until additional tasks are available; and at least one of the one or more library routines is configured to dynamically update a number of objects based on number of waiting tasks.

26. The information handling apparatus according to claim 1 wherein:

at least one of the one or more library routines is configured to organize the plurality of objects to perform a plurality of tasks in a queue and upon completion of a task to request a next task from the queue until all tasks have completed and at least one of the plurality of objects terminates or becomes inactive until additional tasks are available; and at least one of the one or more library routines is configured to determine whether power is below a predetermined threshold and respond by limiting a number of objects.

27. An information handling system comprising:

one or more processors; and at least one network library configured to execute on the one or more processors, the at least one network library including:

one or more library routines configured for execution on one or more processors including:

one or more functions configured to process and manipulate at least one network object stored in a selected storage format;

one or more library components configured to assign entitlement as an allocation of one or more user-predetermined rights of at least one of the one or more functions to one or more selected physical/logical resources or operational resources; and one or more entitlement vectors including at least one field specifying one or more of physical/logical resources or operational resources, and specifying entitlement assigned to the one or more of physical/logical resources or operational resources accessed during execution of at least one of the one or more library routines, the one or more entitlement vectors configured to indicate one or more capabilities to which one or more of the at least one network object is entitled wherein the one or more entitlement vectors are specified as one or more user-predetermined rights wherein an object of a plurality of objects is entitled to at least a predetermined percentage of at least one of the at least one or more physical/logical resources or operational resources; wherein:

at least one of the one or more library components is configured to organize the plurality of objects to perform a plurality of tasks in a queue and upon completion of a task to request a next task from the queue until all tasks have completed and at least one of the plurality of objects terminates or becomes inactive until additional tasks are available; and at least one of the one or more library components is configured to dynamically update a number of objects based on number of waiting tasks.

28. A method configured for execution in a processor in an information handling apparatus comprising:

providing one or more libraries including one or more library routines associated with one or more functions or components;

handling a plurality of objects by execution of at least one of the one or more library routines;

representing entitlement in one or more entitlement vectors including at least one field specifying one or more of physical/logical resources or operational resources, and specifying entitlement assigned to the one or more of physical/logical resources or operational resources accessed during execution of at least one of the one or more library routines wherein the one or more entitlement vectors are specified as one or more user-predetermined rights wherein an object of the plurality of objects is entitled to at least a predetermined percentage of at least one of the at least one or more physical/logical resources or operational resources; and executing at least one of the one or more library routines associated with one or more functions or components based at least partially on the entitlement assigned by the one or more entitlement vectors wherein executing at least one of the one or more library routines includes at least:

organizing the plurality of objects to perform a plurality of tasks in a queue and upon completion of a task to request a next task from the queue until all tasks have completed and at least one of the plurality of objects terminates or becomes inactive until additional tasks are available; and dynamically updating a number of objects based on number of waiting tasks.

29. The method according to claim 28 further comprising:

indicating expected capabilities to which at least one of the plurality of objects is entitled in at least one field of the one or more entitlement vectors.

30. The method according to claim 28 wherein the physical/logical resources include at least one of physical or logical instances of:

processors, central processing units (CPUs), virtual machines, graphics hardware, network controllers, memory, memory management, hardware, microarchitecture, sound cards, video cards, network interfaces, instruction set architecture (ISA), library calls, library functions, software objects, compilers, or operating systems.

31. The method according to claim 28 wherein the operational resources include:

at least one of power, voltage, current, electrons, frequency, execution cycles, battery consumption, battery life, constraints, temperature, or measurable phenomena.

* * * * *